US012659452B2

(12) United States Patent
Alasaarela et al.

(10) Patent No.: US 12,659,452 B2
(45) Date of Patent: Jun. 16, 2026

(54) BINOCULAR NEAR-EYE DISPLAY WITH DISPLAY ALIGNMENT TRACKER

(71) Applicant: Microsoft Technology Licensing, LLC, Redmond, WA (US)

(72) Inventors: Tapani Matias Alasaarela, Espoo (FI); Moran Chen, Fairfax, VA (US); Glen Patrick Gordon, Graham, WA (US); Xiao Chuan Ong, Seattle, WA (US); Francy L Sinatra, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/779,897

(22) Filed: Jul. 22, 2024

(65) Prior Publication Data

US 2026/0025492 A1 Jan. 22, 2026

(51) Int. Cl.
| | |
|---|---|
| *H04N 13/398* | (2018.01) |
| *H04N 13/327* | (2018.01) |
| *H04N 13/344* | (2018.01) |
| *H04N 13/361* | (2018.01) |

(52) U.S. Cl.
CPC ......... *H04N 13/398* (2018.05); *H04N 13/327* (2018.05); *H04N 13/344* (2018.05); *H04N 13/361* (2018.05)

(58) Field of Classification Search
CPC .. H04N 13/398; H04N 13/327; H04N 13/344; H04N 13/361
USPC .......................................................... 348/51
See application file for complete search history.

(56) References Cited

U.S. PATENT DOCUMENTS

| | | | | |
|---|---|---|---|---|
| 9,097,890 | B2 * | 8/2015 | Miller | G02B 27/0093 |
| 9,341,843 | B2 * | 5/2016 | Border | G06F 3/013 |
| 11,397,465 | B1 * | 7/2022 | Mattila | G02B 27/0093 |
| 2014/0375681 | A1 | 12/2014 | Robbins | |
| 2016/0295201 | A1 * | 10/2016 | So | H04N 13/363 |
| 2017/0295362 | A1 | 10/2017 | Travis | |
| 2018/0164583 | A1 * | 6/2018 | Wall | G02B 27/1086 |
| 2020/0278544 | A1 * | 9/2020 | Poulad | G02B 27/0179 |
| 2022/0269076 | A1 | 8/2022 | Yang | |
| 2023/0008359 | A1 | 1/2023 | Huang | |
| 2023/0213772 | A1 | 7/2023 | Lam | |
| 2023/0239455 | A1 | 7/2023 | Churin | |
| 2023/0290290 | A1 | 9/2023 | Shams | |

FOREIGN PATENT DOCUMENTS

BR 102016007570 B1 * 3/2024 ............... H04N 5/44

* cited by examiner

*Primary Examiner* — Behrooz M Senfi
(74) *Attorney, Agent, or Firm* — Michael T. Abramson; Jordan IP Law, LLC

(57) ABSTRACT

A mixed-reality near-eye display system in a head-mounted display (HMD) device includes a display alignment tracker configured for monitoring virtual image pixels in binocular waveguide-based displays and providing adjustments to a display engine to reduce binocular and color misalignments that can occur from thermal expansion of HMD device components and mechanical shock and vibration during device use. Surface relief gratings, located on waveguide combiner plates guiding separate display colors, are configured to in-couple and guide virtual image light from a projector-based display engine and simultaneously out-couple light for the near-eye display and alignment tracking.

20 Claims, 22 Drawing Sheets

Near-eye display system 110

Display engine 205

Waveguide combiner 210

Display alignment tracker 225

220

230

210

215

Eye 105

Optical signals

Control signals

Waveguide 305

Waveguide

Propagation of Central Angles of FOV

1300

1400

Propagation of Bottom Corner of FOV

1310

Right waveguide combiner stack (1610)

Optical beam-steering component (e.g., mirror) (1405)

Right display alignment tracker output couplers (1625)

Eye side (1635)

Folded light path (1630)

Camera (550)

Left display alignment tracker output couplers (1620)

Real-world side (1615)

Left waveguide combiner stack (1605)

Left waveguide combiner stack (1605)

Real-world side (1615)

Right waveguide combiner stack (1610)

Right display alignment tracker output couplers (1625)

Folded light path (1630)

Camera (550)

505

Left display alignment tracker output couplers (1620)

Optical beam-steering component (e.g., mirror) (1405)

Eye side (1635)

*FIG 20*

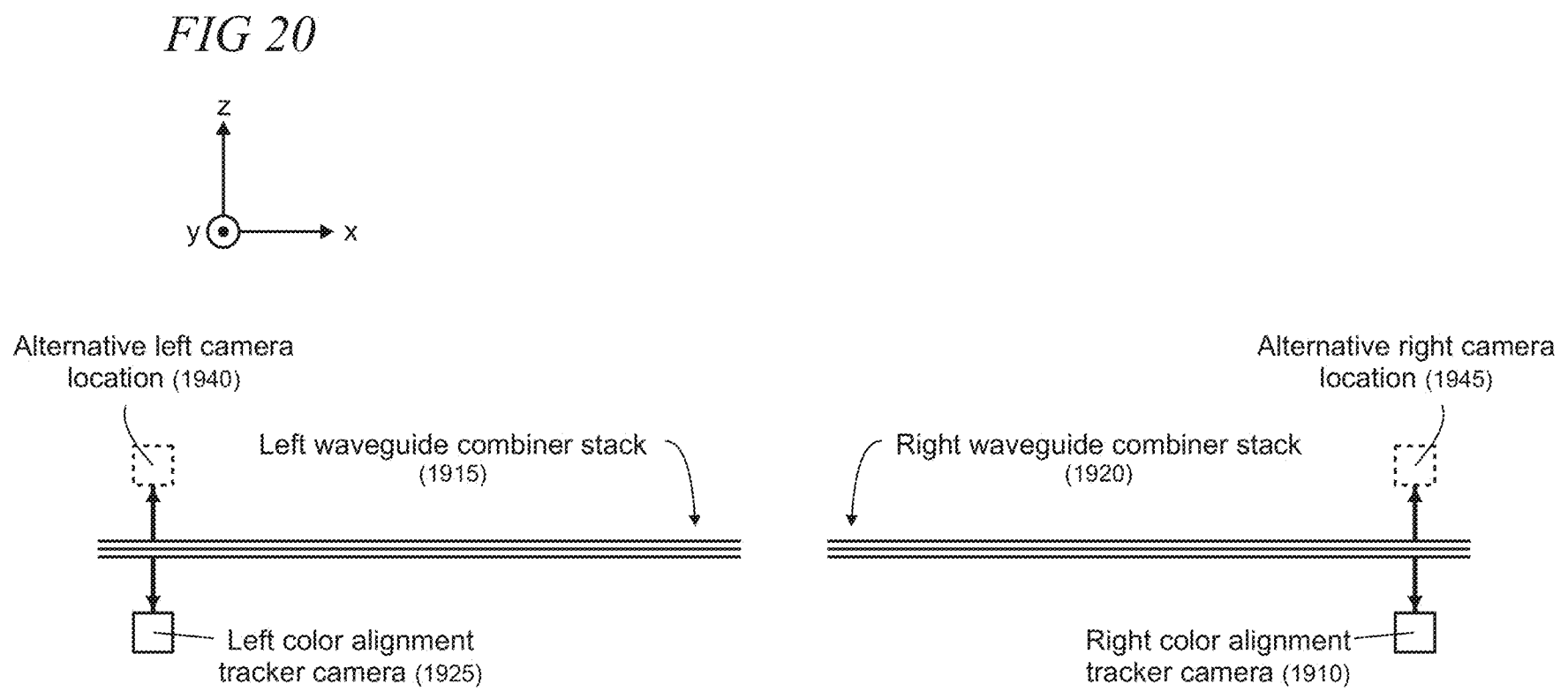

Alternative right camera location (1945)

Right waveguide combiner stack (1920)

Right color alignment tracker camera (1910)

Left waveguide combiner stack (1915)

Left color alignment tracker camera (1925)

Alternative left camera location (1940)

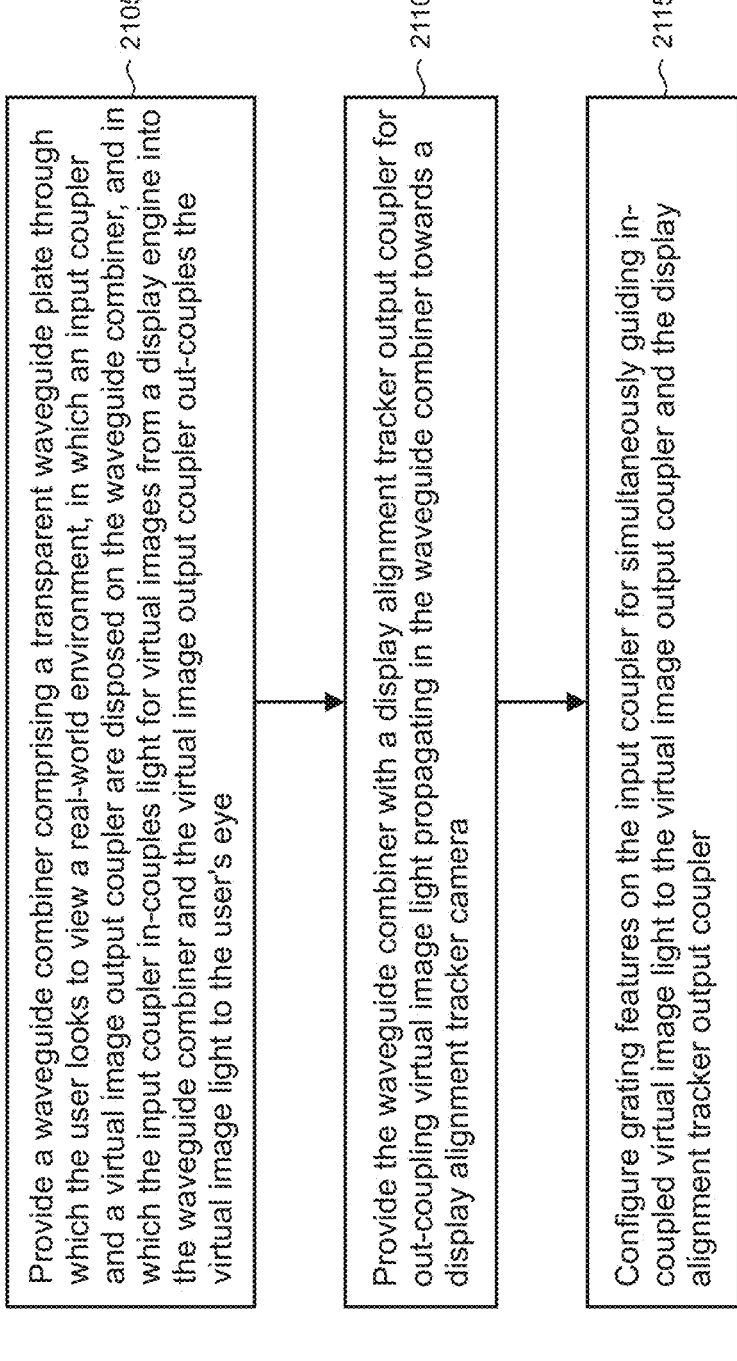

Provide a waveguide combiner comprising a transparent waveguide plate through which the user looks to view a real-world environment, in which an input coupler and a virtual image output coupler are disposed on the waveguide combiner, and in which the input coupler in-couples light for virtual images from a display engine into the waveguide combiner and the virtual image output coupler out-couples the virtual image light to the user's eye

2105

Provide the waveguide combiner with a display alignment tracker output coupler for out-coupling virtual image light propagating in the waveguide combiner towards a display alignment tracker camera

2110

Configure grating features on the input coupler for simultaneously guiding in-coupled virtual image light to the virtual image output coupler and the display alignment tracker output coupler

2115

2200

2200

Depth modulation    2305

Duty cycle modulation    2310

Slant modulation    2315

FIG 24

BINOCULAR NEAR-EYE DISPLAY WITH DISPLAY ALIGNMENT TRACKER

BACKGROUND

Mixed-reality computing devices, such as head-mounted display (HMD) and handheld mobile devices (e.g., smart phones, tablet computers, etc.), may be configured to display virtual objects using virtual images and/or real objects in a field of view (FOV) of an HMD device user and/or a field of view of a camera of the device. For example, an HMD device may be configured to display, using a see-through display system, virtual environments with real-world objects mixed in, or real-world environments with virtual objects mixed in.

SUMMARY

A binocular near-eye display, comprising separate left and right displays each utilizing a see-through waveguide-based optical combiner for respective eyes of a mixed-reality HMD device user, includes a display alignment tracker configured for determining binocular alignment between each display, color alignment within each display, or both binocular and color display alignment. The display alignment tracker uses a camera to capture alignment signals from virtual image light that is out-coupled by a display alignment tracker output coupler disposed on a plate in the waveguide combiner.

A display engine generates the light for virtual objects in a mixed-reality environment. A virtual image output coupler on the waveguide combiner out-couples virtual images over the user's views of the real world as the user looks through the see-through waveguide combiner. An input coupler on the waveguide combiner is configured to in-couple virtual image light from the display engine and simultaneously guide the in-coupled light to the display alignment tracker output coupler and the virtual image output coupler.

Based on the out-coupled optical alignment signals, the display alignment tracker provides control signals to the display engine to adjust the displays, as appropriate, to optimize color fidelity and/or binocular alignment of the displays. Such display control advantageously improves the quality of the HMD device user experience through improved color rendering and minimizes visual discomfort by reducing alignment disparities between the left and right displays.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 12 shows propagation of virtual image light in respective plates of a waveguide combiner for central angles within an FOV of a near-eye display system;

FIG. 17 is a top view of components of an illustrative near-eye display system with a display alignment tracker;

FIG. 20 is a top view of components of an illustrative color alignment tracker;

FIG. 21 is a flowchart for an illustrative method for configuring an input coupler utilized in a near-eye display system;

FIG. 24 is a pictorial view of an illustrative example of a mixed-reality HMD device that is configurable to use the present near-eye display with display alignment tracker.

Like reference numerals indicate like elements in the drawings. Elements are not drawn to scale in the drawings.

DETAILED DESCRIPTION

Figure 1:
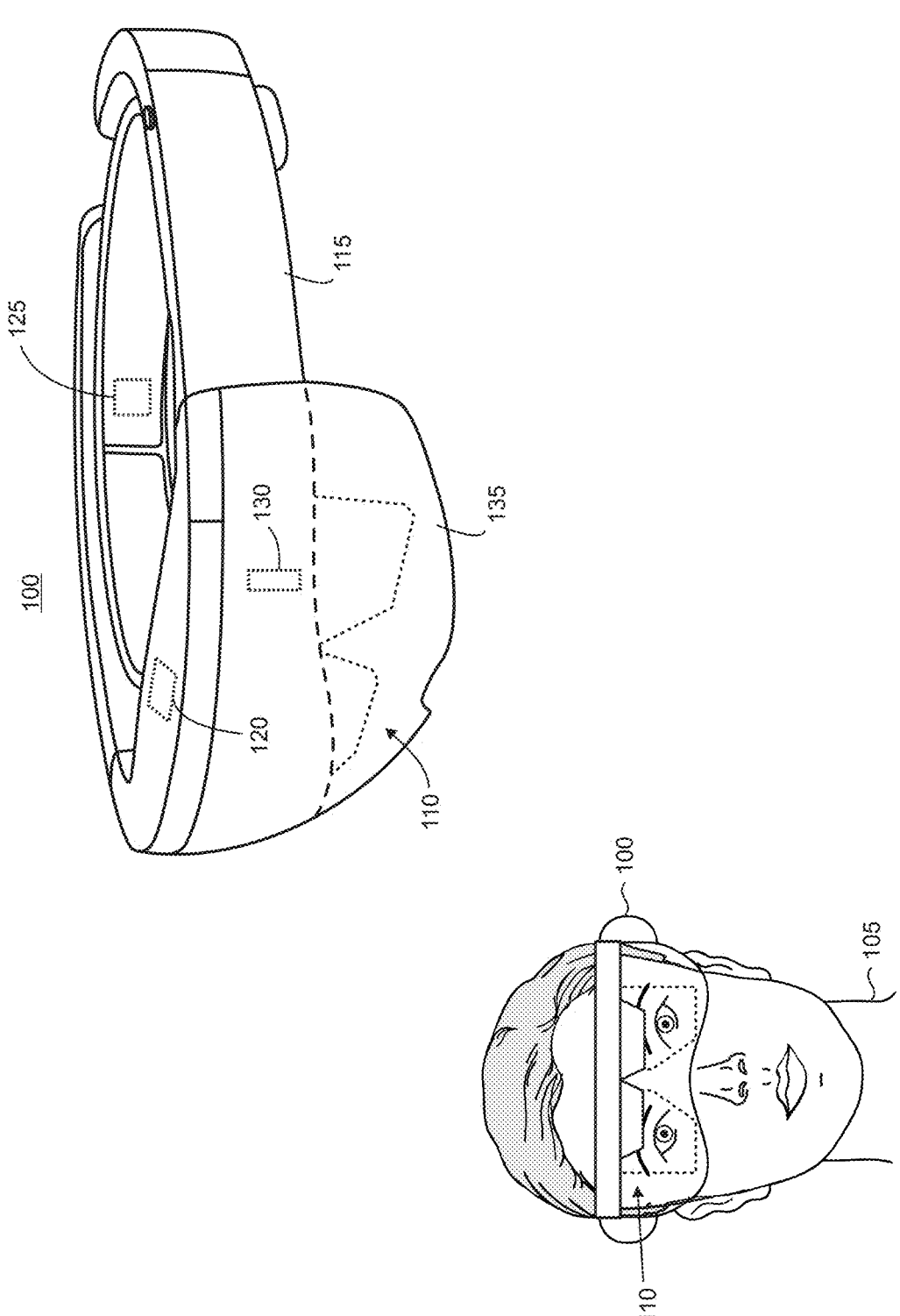
FIG. 1 shows an illustrative mixed-reality head-mounted display (HMD) device.

Mismatches between cues used in natural vision of the real world and artificial cues provided by mixed-reality experiences with head-mounted display (HMD) devices can cause user fatigue, visual stress, and discomfort. Misalignments in mixed-reality displays can lead to vergence-accommodation conflicts, binocular rivalry, and other visual discomforts, causing eye strain, headaches, and fatigue, especially during prolonged use. Mixed-reality HMD devices typically utilize stereoscopic rendering to provide depth cues and a sense of three-dimensional (3D) space for users. Precise alignment of the left and right eye displays is important for proper binocular fusion and accurate depth perception.

Accurate color reproduction is also important to maintain an immersive and realistic mixed-reality environment for HMD device users and facilitate task performance in scenarios where precise colors are required to ensure accurate perception and decision-making. Inaccurate color rendering due to misalignments in display engine and display components can interfere with the user's sense of presence and lessen the quality of the user experience. Poor display color fidelity, particularly in the blue light spectrum, can also exacerbate fatigue, visual stress, and discomfort.

Compared with virtual-reality devices, display disparities and the resulting negative effects can be especially pronounced in mixed-reality HMD devices because virtual-world and real-world content is intended to be seamlessly integrated. Misalignment between the virtual and real content can break the mixed-reality illusion and cause visual discomfort. For HMD devices having eye-tracking capabilities, misalignment between the display and tracking sensors can introduce rendering errors and distortions which can degrade the user experience.

Mixed-reality HMD devices often have complex optical systems and relatively tight manufacturing tolerances. Small deviations in the alignment of displays and other components can significantly impact the overall display system alignment and user experience. However, even in well-designed and manufactured systems, display issues can occur as a result of thermal expansion of components during HMD device use and from mechanical shock and vibration. Accordingly, it is desirable to configure an HMD device for monitoring the position and alignment of pixels in a display and enable the display to be adjusted as required to ensure that virtual content maintains correct alignment.

In an exemplary embodiment of the present principles, a display system is configured as a near-eye display that is located close to a user's eyes, for example in an HMD device. The display system uses a projection system and a see-through waveguide combiner to project virtual images directly into the user's eyes while simultaneously enabling the user to view the real world through the combiner. The waveguide combiner is constructed using a stack of three waveguide combiner plates in which a separate plate is used to guide virtual image light from separate RGB (red, green, blue) projectors in a display engine. In an illustrative example, the RGB projectors comprise an emissive panel implemented, for example, using micro-LEDs (light emitting diodes) or micro-OLEDs (organic light emitting diodes), and projection optics such as a collimating lens.

An input coupler on each waveguide combiner plate in-couples virtual image light for a respective color. A virtual image output coupler on each waveguide combiner plate out-couples virtual image light to the user's eye as a near-eye display. In an illustrative example, each of the input and virtual image output couplers is implemented as a surface relief grating (SRG). In an illustrative example, the virtual image output coupler is configured to provide exit pupil expansion in two dimensions (e.g., vertically and horizontally).

Each waveguide combiner plate also includes a display alignment tracker output coupler that receives virtual image light propagating in the plate from the input coupler. The display alignment tracker output coupler out-couples optical alignment signals that are captured by camera. A controller provides control signals to the display engine to control display alignment based on the optical alignment signals that are out-coupled from the display alignment tracker output coupler.

In another exemplary embodiment of the present principles, an HMD device includes a display engine for generating virtual image light used in a mixed-reality display. A pair of see-through waveguide combiners is utilized to support a binocular mixed-reality user experience. Each waveguide combiner in the binocular-pair includes a binocular alignment tracker output coupler, a virtual image output coupler, and an input coupler. Each input coupler is configured to in-couple virtual image light from the display engine into a respective waveguide combiner and guide light towards the virtual image output coupler for out-coupling virtual images to an HAMID device user's eyes. Each input coupler is configured with particular grating periods and orientations to enable simultaneous guiding towards the virtual image output coupler and binocular alignment tracking output coupler.

The input coupler also guides light towards the binocular alignment tracker output coupler for out-coupling as binocular alignment signals to a binocular alignment tracker camera. In an illustrative example, a single binocular alignment tracker camera is utilized which may be centrally located in the HMD device on the real-world side of the waveguide combiners. A light steering optical component, for example, a front surface mirror, rear surface mirror (using high refractive index glass), or prism is located on the eye-side of the waveguide combiners and utilized to steer the binocular alignment signals over a folded path to keep the components of the binocular alignment tracker within a compact form factor. A binocular alignment tracker controller uses the signals to determine binocular alignment of the display and sends control signals to a display engine controller to adjust the binocular alignment of the display, as appropriate.

In an illustrative example of the HMD device, the display engine generates polychromatic virtual images based on an RGB (red, green, blue) color model and the waveguide combiner is implemented as a single plate that propagates all the colors of the RGB color model. In another illustrative example of the HMD device, each waveguide combiner in the binocular-pair is constructed using a stack of waveguide combiner plates in which each plate in the stack propagates virtual image light for a different component of the RGB color model.

A pair of color alignment tracker cameras may be utilized—one per waveguide combiner in the binocular-pair—and a color alignment tracker output coupler is located on each waveguide combiner plate, for example, along a side or corner of the plate where they are less visible to the HMD device user. The cameras capture optical alignment signals out-coupled from respective color alignment tracker output couplers in the binocular-pair of waveguide combiners. A color alignment controller utilizes the optical alignment signals captured by the camera to determine alignment of colors from each RGB projector in the display supported on each waveguide combiner. The controller sends control signals to a display engine controller to adjust the color alignment of a display, as appropriate.

In an exemplary method incorporating the present principles, an input coupler is configured for simultaneously guiding in-coupled virtual image light to a virtual image output coupler and a display alignment tracker output coupler in which the output couplers are located on a see-through waveguide combiner. In an illustrative example of an input coupler configuration, the input coupler is double-sided—a first side of the input coupler guides in-coupled virtual image light to the virtual image output coupler and a second side of the input coupler, opposite the first side, guides in-coupled virtual image light to the display alignment tracker output coupler. In another illustrative example of an input coupler configuration, both sides of the double-sided input coupler couple virtual image light from the display engine in different directions. The coupling interactions cause the virtual image light to be coupled in a nominal eye direction. In another illustrative example of an input coupler configuration, one side of the input coupler has grating features that are shallow relative to grating features on an opposite side of the input coupler, and the grating features on the opposite side of the input coupler are metallized.

Turning now to the drawings, FIG. 1 shows a partially cutaway view of an illustrative mixed-reality HMD device 100 that incorporates the present binocular near-eye display with display alignment tracker as worn by a user 105. The HMD device includes a near-eye display system 110 and a frame 115 that wraps around the head of the user to position the display system near the user's eyes to provide a mixed-reality experience to the user. For a mixed-reality experience, the display system is see-through so that the user of the HMD device can view physical, real-world objects in the physical environment over which pixels for virtual objects are overlayed.

The frame 115 further supports additional components of the HMD device 100, including a processor 120, an inertial measurement unit (IMU) 125, and an eye tracker 130. The processor includes logic and associated computer memory configured to receive sensory signals from the IMU and other sensors (not shown) to provide display signals to the display system 110, to derive information from collected data, and to enact various control processes described herein. The HMD device includes a transparent eye shield 135 that protects the display system 110 from damage, for example, due to handling and environmental conditions.

Figures 2, 3:
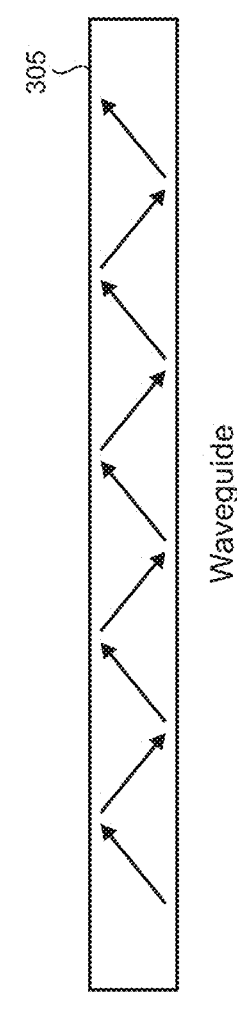
FIG. 2 is a block diagram of illustrative components in an illustrative near-eye display system.
FIG. 3 shows propagation of light in a waveguide by total internal reflection (TIR)

FIG. 2 is a block diagram of illustrative components in the near-eye display system 110. The display system includes a display engine 205 and a transparent waveguide-based optical combiner (referred to herein as a see-through waveguide combiner 210). The display system may include imaging optics such as magnifying and/or collimating optical components (not shown) to provide virtual images and real-world images over a light path 215. In this illustrative example, the waveguide combiner includes exit pupil expander (EPE) functionalities, as described below.

Figure 5:
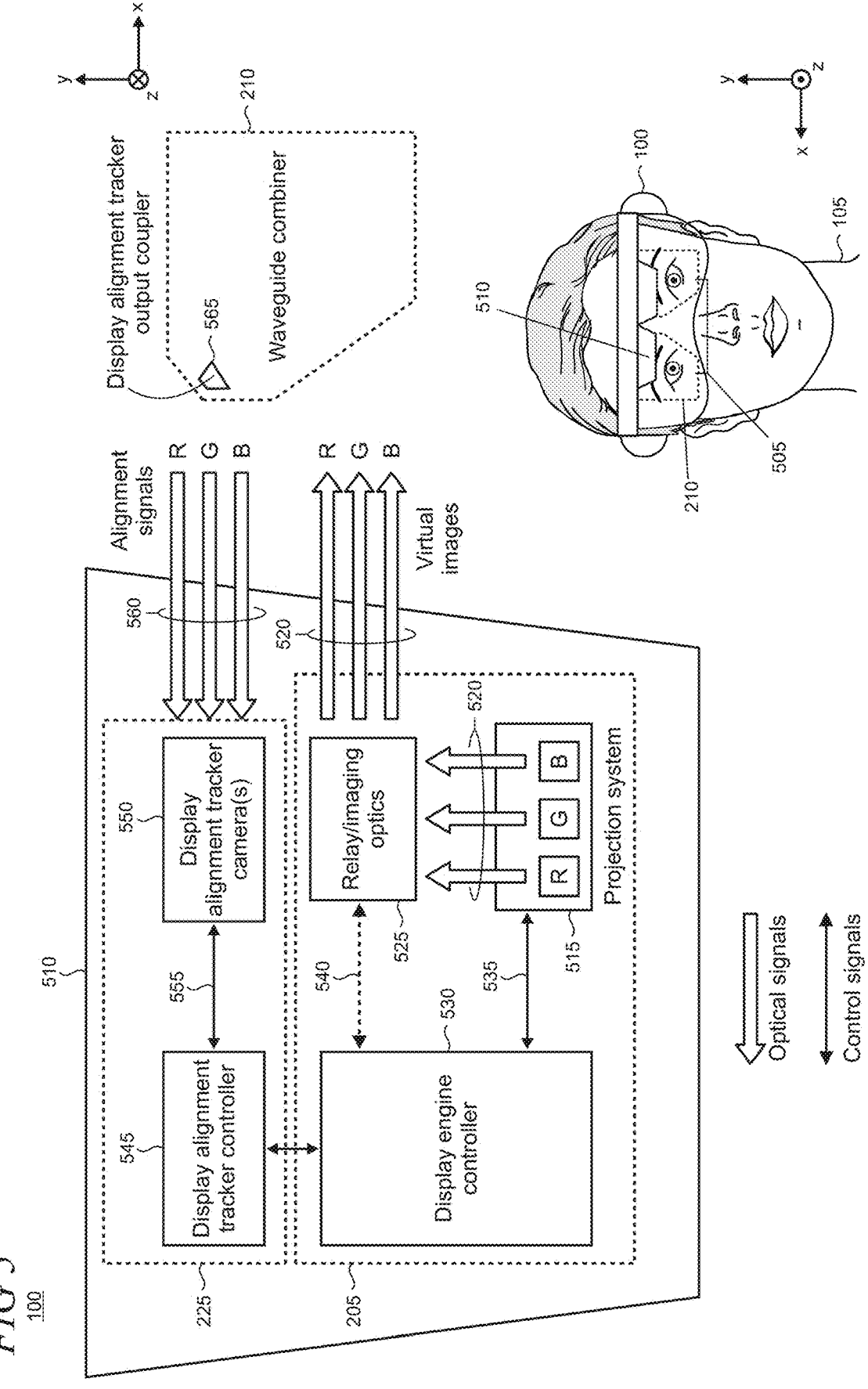
FIG. 5 shows an illustrative architecture for a near-eye display system.
Figure 6:
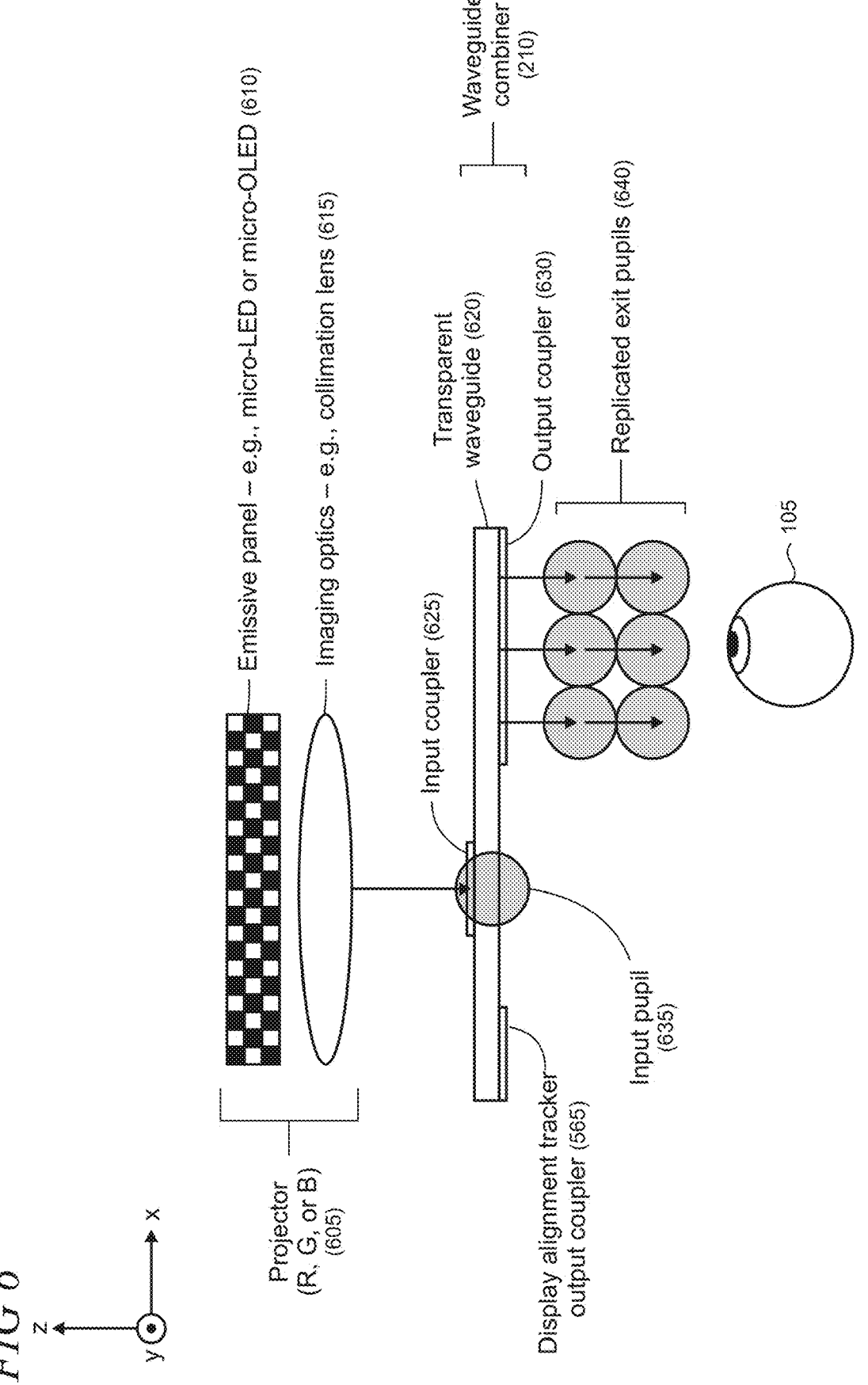
FIG. 6 shows illustrative pupil replication in a near-eye display system using a projection system.

The display engine 205 is a source of virtual-world objects or holographic images (collectively referred to herein as "virtual images"). The display engine delivers light 220 for virtual images to the waveguide combiner 210 to provide a near-eye display to a user's eye 105. In an illustrative example, as shown in FIGS. 5 and 6 and discussed in the accompanying text below, the display engine is configured as a micro-projector system using emissive panels. For other implementations, the display engine may be generally configured, for example, using RGB (red, green, blue) light emitting diodes (LEDs) or lasers, LCoS (liquid crystal on silicon) devices, OLED (organic light emitting diode) arrays, DLP (digital light processing) solutions, MEMS (micro-electro-mechanical system) devices, or any other suitable displays or micro-displays operating in transmission, reflection, or emission. The display engine is further configurable in some cases to include electronics such as processors, optical components such as mirrors and/or lenses, and/or mechanical and other components that enable a virtual display to be composed and to provide optical beams for the virtual images to the waveguide combiner.

The near-eye display system 110 further includes a display alignment tracker 225. The display alignment tracker is optically coupled to the waveguide combiner 210 via a display alignment tracker output coupler on the waveguide to receive optical alignment signals. The display alignment tracker is operatively coupled to the display engine 205 for communication of control signals 230. Further description of the display alignment tracker is provided below.

Near-eye display systems are often used, for example, in HMD devices in industrial, commercial, military, and consumer applications. In a near-eye display system, the display engine does not actually shine the images on a surface such as a glass lens to create the visual display for the user. This is not feasible because the human eye cannot focus on something that is that close. Rather than create a visible image on a surface, the display system forms a pupil and the eye 105 acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the virtual image light after leaving the display system. The exit pupil defines the eyebox which comprises a spatial range of eye positions of the user in which the virtual images projected by the display system are visible.

The waveguide combiner 210 uses a waveguide 305 as shown in FIG. 3. The waveguide operates using a principle of total internal reflection (TIR), as shown in the drawing, so that light can be coupled among the various optical elements in the display system. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

Figure 4:
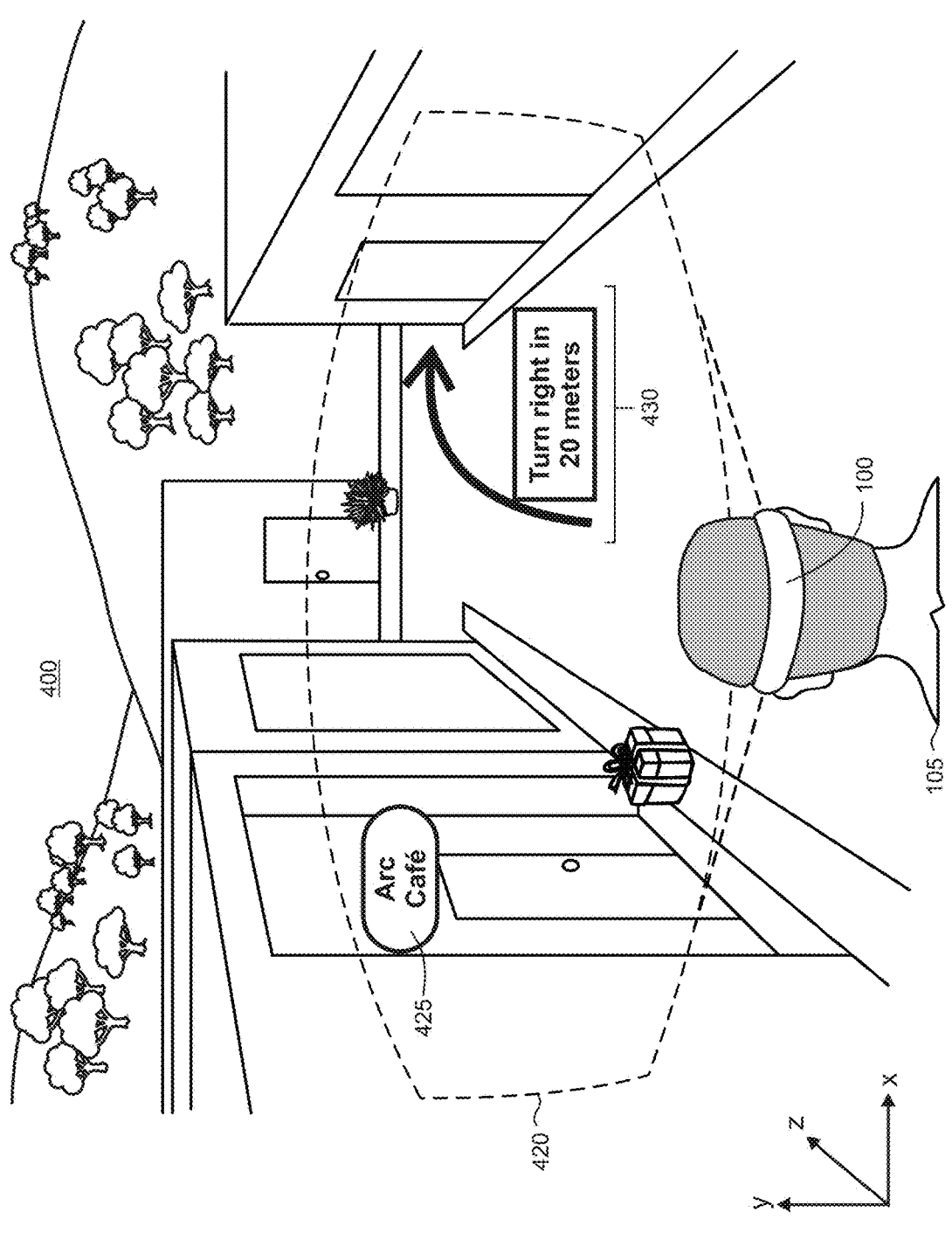
FIG. 4 illustratively shows virtual images that are overlayed onto real-world images within a field of view (FOV) of a mixed-reality HMD device.

FIG. 4 shows the HMD device 100 worn by a user 105 as configured for mixed-reality experiences. As noted above, a display engine (not shown) generates virtual images that are guided by the waveguide in the display system to the user. Being see-through, the waveguide in the near-eye display system enables the user to perceive light from the real world. The near-eye display system renders images of various virtual objects that are superimposed over the real-world images that are collectively viewed using the see-through waveguide display to thereby create a mixed-reality environment 400 within the HMD device's FOV (field of view) 420. It is noted that the FOV of the real world and the FOV of the images in the virtual world are not necessarily identical, as the virtual FOV provided by the near-eye display system is typically a subset of the real FOV. FOV is typically described as an angular parameter in horizontal, vertical, or diagonal dimensions.

It is noted that FOV is just one of many parameters that are typically considered and balanced by HMD device designers to meet the requirements of a particular implementation. For example, such parameters include eyebox size, brightness, transparency and duty time, contrast, resolution, color fidelity, depth perception, size, weight, formfactor, and user comfort (i.e., wearable, visual, and social), among others.

In the illustrative example shown in FIG. 4, the user 105 is physically walking in a real-world urban area that includes city streets with various buildings, stores, etc., with a countryside in the distance. The FOV of the cityscape viewed on HMD device 100 changes as the user moves through the real-world environment and the device can render static and/or dynamic virtual images over the real-world view. In this illustrative example, the virtual images include a tag 425 that identifies a restaurant business and directions 430 to a place of interest in the city. The mixed-reality environment 400 seen visually on the near-eye display system is also supplemented by audio and/or tactile/haptic sensations produced by the HMD device in some implementations.

FIG. 5 shows an illustrative architecture for an exemplary embodiment of the near-eye display system 110 in the HMD device 100. The near-eye display system is implemented, in this illustrative example, as two individual waveguide combiners 210 that are arranged and operated as a binocular-pair of combiners 505 (i.e., one waveguide combiner for each eye of the user 105). Each waveguide combiner in the binocular-pair is associated with corresponding display engine components in a housing 510. Thus, the HMD device 100 includes two waveguide combiners and two housed display engines. In alternative implementations of the HMD device, the device is configurable for monocular operation or binocular operation using shared waveguide combiners and/or shared display engines.

The display engine 205 includes a projection system 515 that operates in an RGB (red, green, blue) color space to produce corresponding virtual images for a display on the waveguide combiner 210 comprising RGB optical signals 520. The projection system operates in conjunction with relay and/or imaging optics 525, as shown in FIG. 6 and discussed in more detail below. A display engine controller 530 is operatively coupled to the projection system, as indicated by line 535. The controller is optionally coupled to the relay/imaging optics in some implementations in which active components are utilized, as indicated by the dashed line 540. In some implementations, the display engine controller may be integrated with the projection system and not be separately instantiated. However, the functionalities and features of the controller will enable operation in a similar manner in either case.

Figure 9:
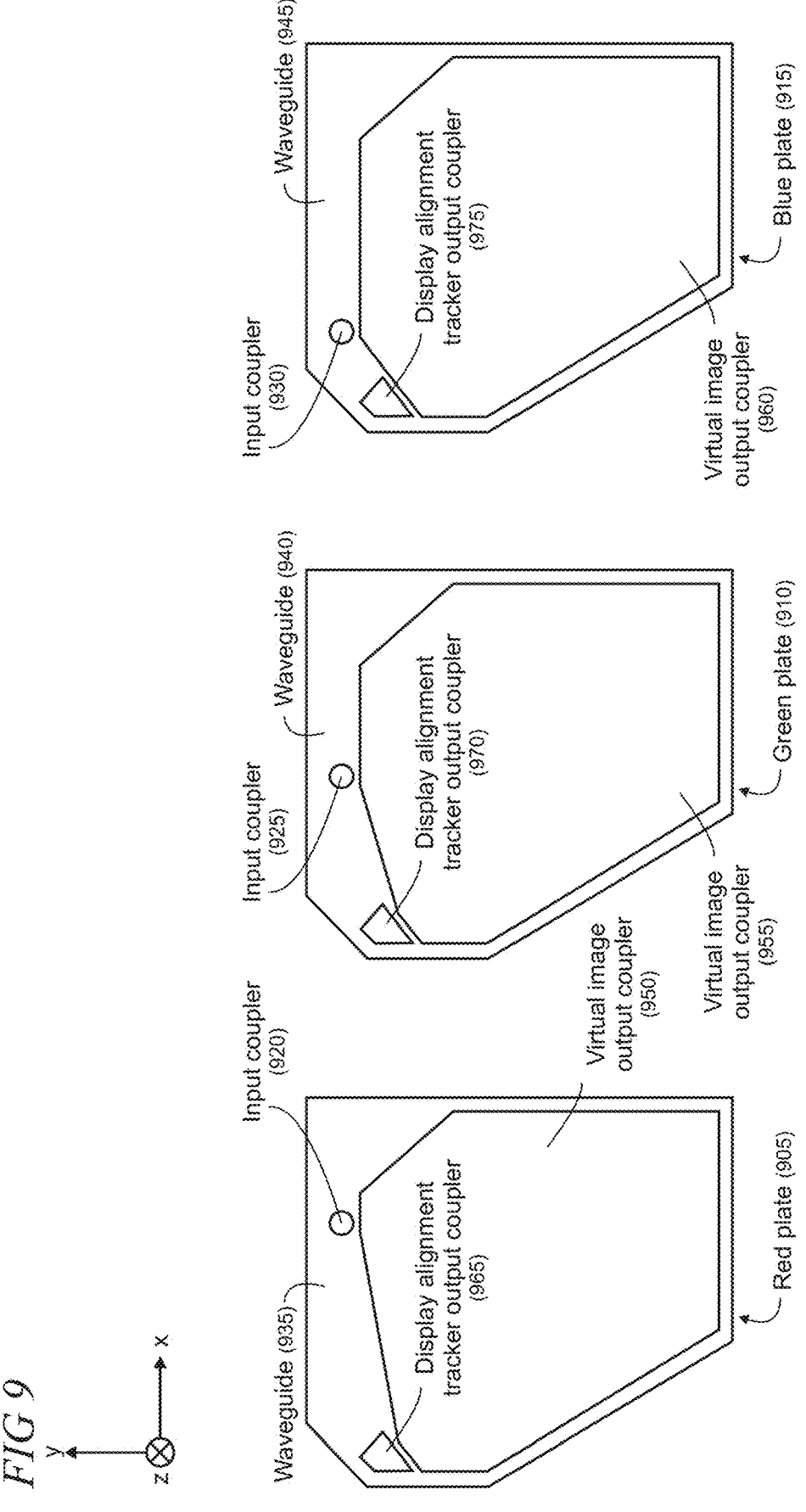
FIG. 9 shows respective illustrative RGB waveguide combiner plates in a multi-plate waveguide combiner architecture.

The display alignment tracker 225 is implemented, in this illustrative example, using a display alignment tracker controller 545 and one or more display alignment tracker cameras 550 that are operatively coupled as indicated by line 555. In some implementations, the display alignment tracker controller may be integrated with the display engine controller 530. The alignment cameras are configured to capture optical alignment signals 560 that are out-coupled from display alignment tracker output couplers (representatively indicated by reference numeral 565) that are disposed on different constituent waveguide plates of the waveguide combiner 210, as shown in FIG. 9 and discussed below.

FIG. 6 shows details of an illustrative projector 605 that is utilized in the projection system 515 (FIG. 5). The projection system is arranged so that an individual projector is utilized for each component of the RGB color space. The projector 605 includes an emissive panel 610 such as a micro-LED (light emitting diode) or micro-OLED (organic light emitting diode) panel. The projector can generate polarized or unpolarized light. The relay/imaging optics 525 (FIG. 5) are implemented in this illustrative example using a collimation lens 615.

The waveguide combiner 210 is arranged using a transparent waveguide 620 on which various diffractive optical elements are located. These elements have surface relief grating (SRG) construction and include an input coupler 625, and virtual image output coupler 630, and the display alignment tracker output coupler 565. The location of the input and virtual image output couplers can vary by implementation. In this illustrative example, the projector is located on the opposite side of the eyebox and the input and virtual image output couplers are located on opposite sides of the substrate. In other implementations, the input coupler and virtual image output coupler can be located on the same side of the substrate. The coupler locations are typically determined based on a variety of factors including requirements for optical performance, FOV, packaging, and other considerations.

Figure 7:
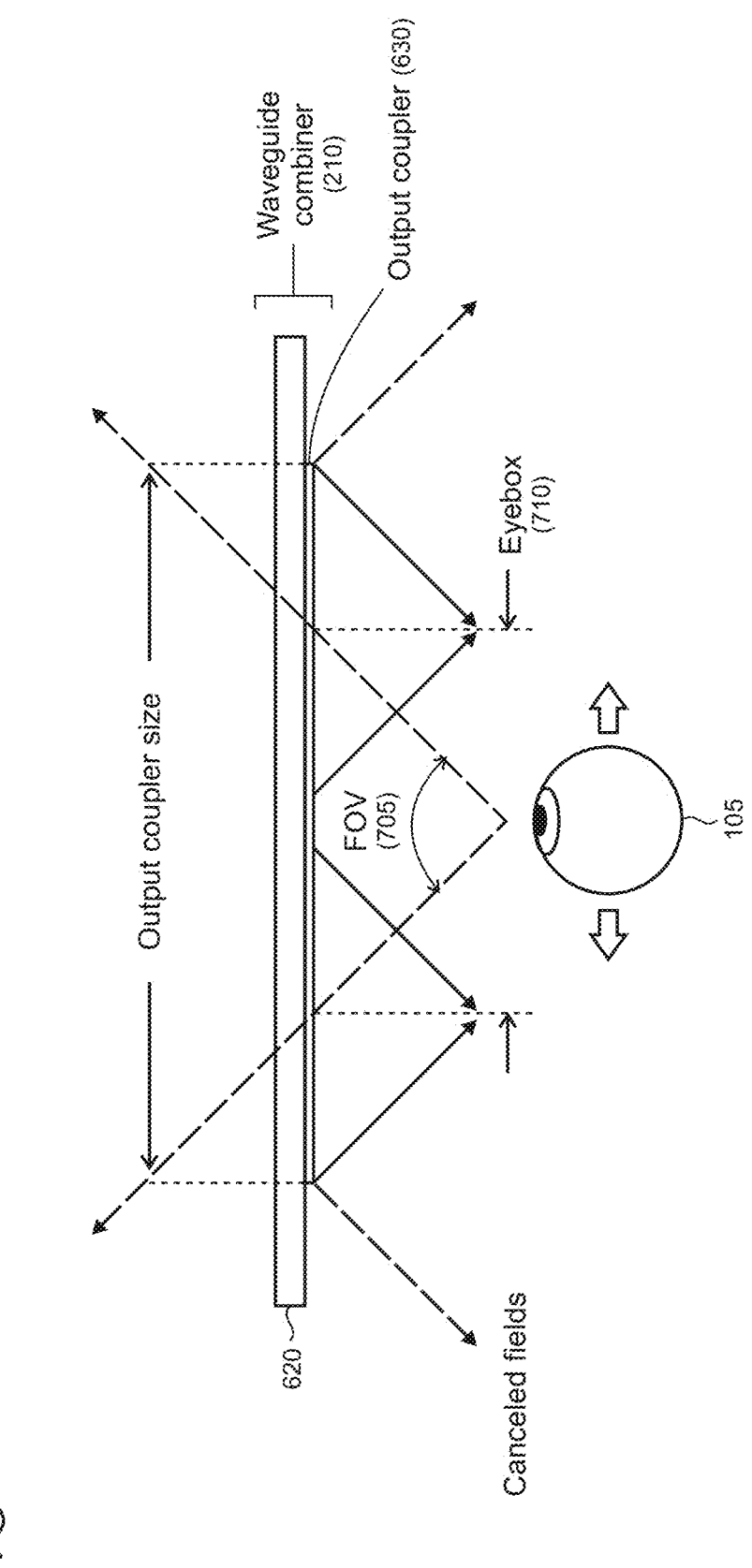
FIG. 7 shows an illustrative eyebox of a near-eye display system.

As shown in FIG. 6, the input coupler 625 couples light from the projector 605 into the waveguide combiner 210 to generate an input pupil 635. As the projector generates a relatively small input pupil, the waveguide combiner is configured for exit pupil expansion to produce a replicated exit pupil 640 in two directions (e.g., horizontally and vertically) to form a single image over the entirety of the eyebox. As shown in FIG. 7, the size of virtual image output coupler 630 is dependent on FOV 705 and dimensions of the eyebox 710 (the input coupler and display alignment tracker output coupler are omitted from the drawing for clarity). Some fields at the edges of the virtual image output coupler will be canceled and not enter the eye pupil.

Figure 8:
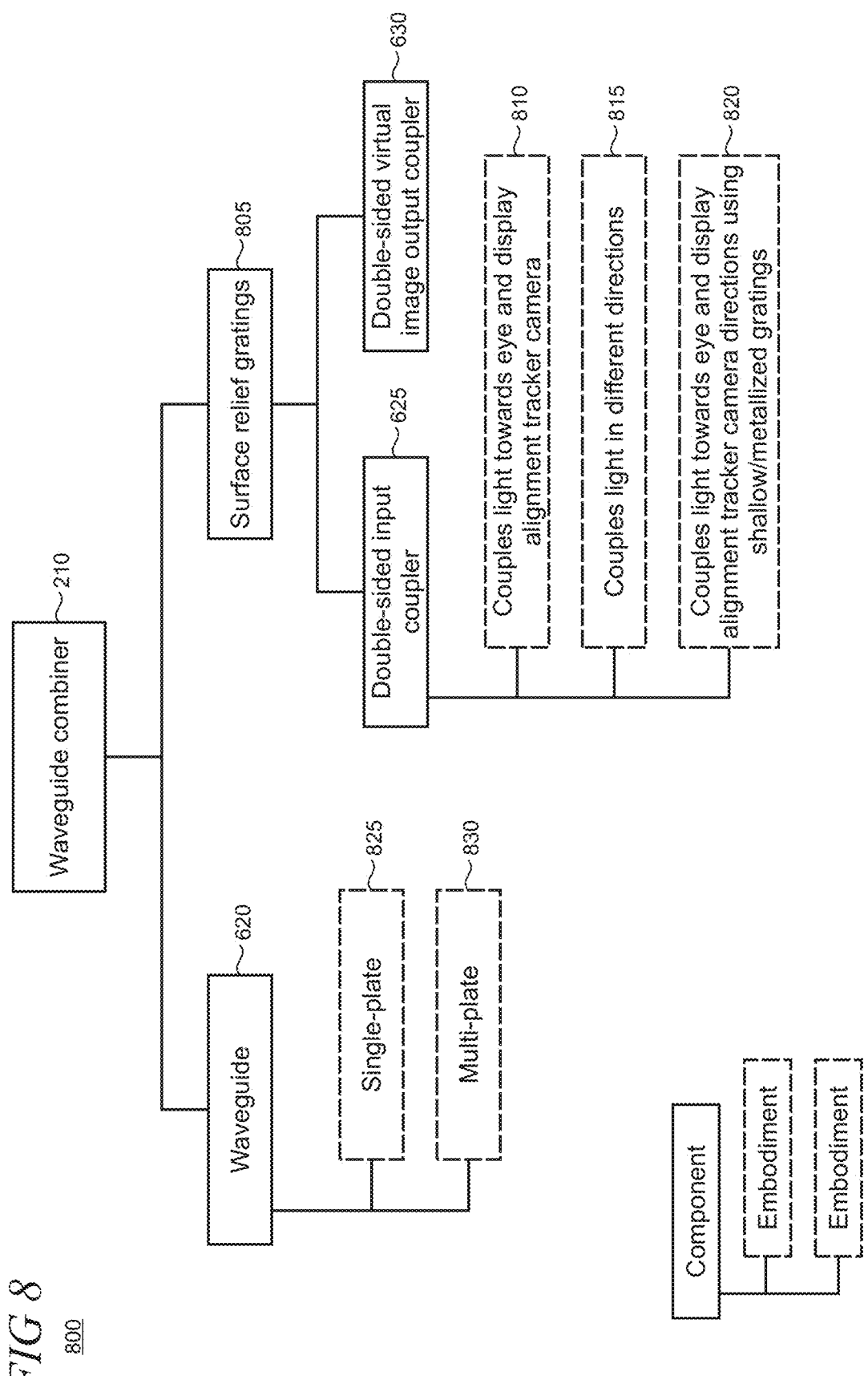
FIG. 8 shows illustrative embodiments of components of a waveguide combiner.

The waveguide combiner 210 is alternatively configurable in different embodiments, as shown in taxonomy 800 in FIG. 8 (components are indicated using solid lines in the drawings while alternative embodiments of the components are indicated using dashed lines). Components of the waveguide combiner include the waveguide 620 and surface relief gratings 805 comprising the input coupler 625 and virtual image output coupler 630 which are configured as double-sided diffractive optical elements.

Alternative embodiments for the input coupler 625 include an embodiment 810 in which the input coupler couples light in the direction of the user's eye (i.e., towards the virtual image output coupler 630) and towards the display alignment tracker output coupler 565. In this embodiment, the frontside of the input coupler guides virtual image light towards the nominal eye direction. Light impinging on the opposite backside of the input coupler is guided towards the display alignment tracker output coupler. In an alternative embodiment 815 for the input coupler, both sides of the input coupler couple virtual image light from the projector in the display engine to different directions such that interactions between the virtual image light and input coupler grating structures couple the light towards the nominal eye direction.

In another alternative embodiment 820 for the input coupler 625, the frontside of the input coupler has shallower grating features compared with the opposite backside, which is metallized, for example with an aluminum layer having high reflectivity across the visible light spectrum, to produce a reflective diffraction grating. In this embodiment the shallower frontside grating features are utilized to guide the virtual image light from a projector in the display engine to the display alignment tracker output coupler 565.

Unlike other typical SRG architectures where an intermediate diffractive optical element (also termed a "redirection grating") is used to perform exit pupil expansion in one direction, in the present embodiments of the waveguide combiner, the virtual image output coupler is configured for exit pupil expansion in two directions and an intermediate diffractive optical element is not utilized in order to free up space on the waveguide combiner. This design choice provides for accommodation of the three separate display projectors using emissive panels while keeping the overall package size for the display engine and waveguide combiner reasonably compact.

Alternative embodiments for the waveguide 620 in the waveguide combiner 210 include a single-plate embodiment 825 and a multi-plate embodiment 830. The single-plate embodiment may be desirable in some applications of the present principles because it reduces the weight, size, and complexity of the waveguide combiner while propagating the maximum FOV allowed by the refractive index of the waveguide. Use of a single plate eliminates the need to align multiple plates. However, it may be appreciated that strong spectral spread of the in-coupler can cause individual color fields of the virtual image light to be coupled at increasingly higher angles as the wavelength increases. This can reduce the overall RGB FOV overlap that can propagate within the waveguide within TIR conditions. Increased input coupler efficiency using, for example, SRGs with a higher refractive index can widen spectral and angular bandwidth.

The multi-plate embodiment 830 for the waveguide 620 comprises either two-plate or three-plate architectures. The two-plate architecture may include several variations. A first variation of the two-plate architecture includes splitting the FOV of the green component of the virtual image light between the first and second waveguide plates. The split FOVs are optically stitched together at the virtual image output coupler. A second variation of the two-plate architecture includes using the first waveguide plate to propagate the blue and green components of the virtual image light and use the second waveguide plate to propagate on the red component, as blue and green are closer spectrally to each other than to red. This variation may reduce the allowed FOV travelling in the combiner without virtual image vignetting (i.e., a drop of image brightness at the edges of the FOV) but can address issues with green FOV stitching.

A three-plate architecture of the waveguides 620 in the waveguide combiner 210 is described in the text below and shown in the accompanying drawings. While the three-plate architecture brings a small penalty in size, weight, and cost of the HMD device, the added complexity of color split geometries and resulting color non-uniformities over the eyebox in two-plate architectures may overshadow such packaging penalties. In addition, the inventors have found that a three-plate architecture for the waveguides with three separate RGB input pupils for the respective projectors in the emissive panel-based display engine provides a particularly good balance among competing design criteria for optical performance (including color uniformity) and HMD device packaging.

Figures 10, 11:
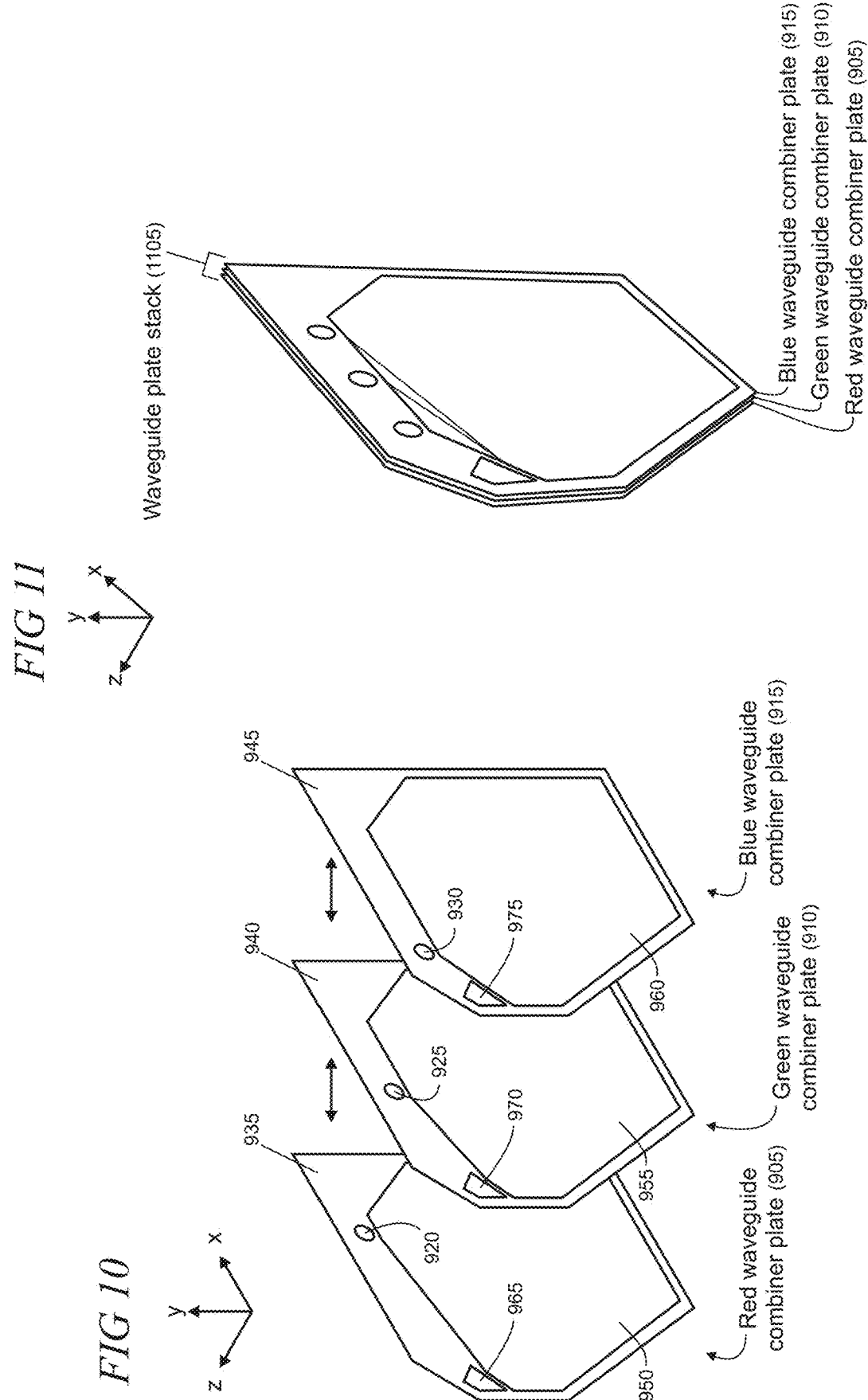
FIGS. 10 and 11 show an illustrative stack of waveguide combiner plates.

FIG. 9 shows illustrative respective RGB waveguide combiner plates 905, 910, and 915 in a multi-plate waveguide combiner architecture. FIG. 10 shows an exploded view of the waveguide combiner plates and FIG. 11 shows the plates as assembled in a stack 1105. An air gap (not shown) is maintained in the assembled plates to produce the TIR condition. The order of waveguide combiner plates in the stack can vary from what is shown in the drawing as may be required to meet particular design goals.

Returning to FIG. 9, input couplers 920, 925, and 930 are located on respective waveguides 935, 940, and 945. Input coupler grating features and parameters are optimized for the single color being in-coupled from the projectors in the display engine and propagated (a discussion of grating parameters is provided below in the text below accompanying FIGS. 22 and 23). The input couplers are spatially located on their respective waveguides to provide for in-coupling of virtual image light from the separate projectors in the display engine with optimized color uniformity. In this illustrative embodiment, separate input pupils are provided for each component of the RGB color space using respective high-resolution emissive panels (e.g., micro-LED and/or micro-OLED panels). Such panels may be larger in size relative to other display types due to constraints imposed, for example, by pixel pitch. The input couplers in the waveguide combiner are spatially separated to accommodate packaging of the emissive panels and the associated collimating lenses that are sized to ensure reasonable collimation efficiency while collecting light from all the pixels in a respective panel.

In alternative embodiments, reflective display technologies (e.g., LCoS or DLP) may be utilized to implement a single-panel display architecture using a single collimation lens to collect light for each RGB component for a combined input pupil. In this alternative embodiment, the input couplers on the respective waveguide combiner plates (and corresponding input pupils) can be spaced more closely inside the combined input pupil. However, it may be appreciated that the diameter of each input pupil may be limited to the size of the emitter in the light source which may impact eyebox size and FOV, among other display design parameters.

Display alignment tracker output couplers 965, 970, and 975 are located on respective waveguides 935, 940, and 945. The grating features and parameters of the couplers are optimized for the single color of light that is in-coupled by an input coupler and propagated in a respective waveguide.

Virtual image output couplers 950, 955, and 960 are located on respective waveguides 935, 940, and 945. Grating features and parameters are optimized for the single color of light being propagated in a respective waveguide and out-coupled by the virtual image output coupler with expanded exit pupil as a color component of the virtual images to the HMD device user. The virtual image output couplers are each uniquely shaped (in plan view) to enable an input coupler and display alignment tracker output coupler on a given waveguide plate to be directly optically coupled (i.e., without any intervening grating structures) to thereby maximize the amount of light that is collected at the display alignment tracker output coupler and available for capture by a display alignment tracker camera.

Figure 12:
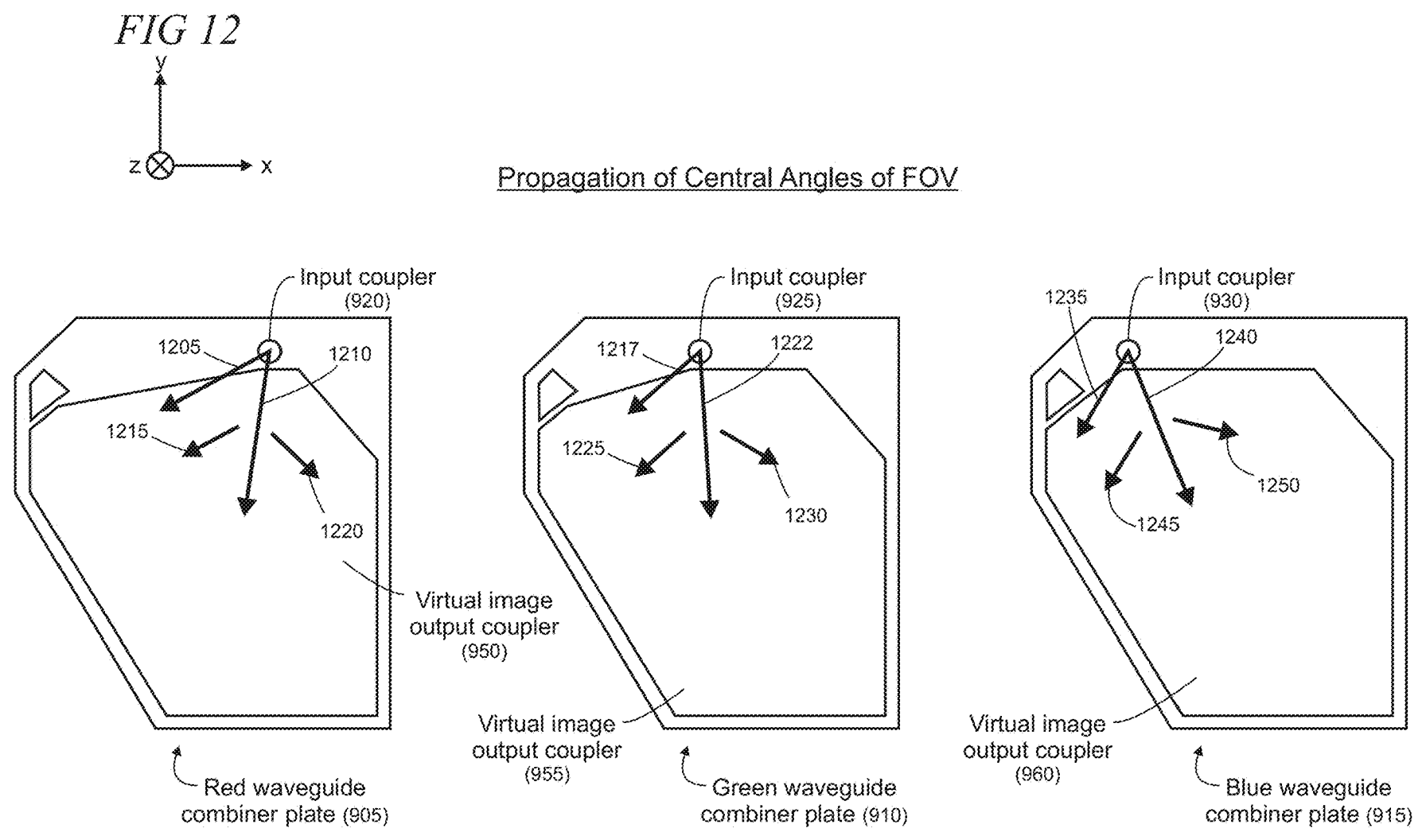

FIG. 12 shows illustrative propagation directions for color components of virtual image light in the respective plates 905, 910, and 915 of the waveguide combiner for central angles within an FOV of the HMD device 100 (FIG. 1). Vectors 1205 and 1210 indicate approximate directions for propagation of the red component of virtual image light for central angles within the FOV as in-coupled by the different sides of the double-sided input coupler 920 in the red waveguide combiner plate 905. The input coupler is located spatially close to the virtual image output coupler to guide virtual image light towards the eye with minimized propagation length. Vectors 1215 and 1220 indicate approximate directions for propagation of the red component of virtual image light guided from the different sides of the double-sided virtual image output coupler 950 to replicate the exit pupil across the eyebox of the wavelength combiner.

Vectors 1217 and 1222 indicate approximate directions for propagation of the green component of virtual image light for central angles within the FOV as in-coupled by the different sides of the double-sided input coupler 925 in the green waveguide combiner plate 910. Vectors 1225 and 1230 indicate approximate directions for propagation of the green component of virtual image light guided from the different sides of the double-sided virtual image output coupler 955. Vectors 1235 and 1240 indicate approximate directions for propagation of the blue component of virtual image light for central angles within the FOV as in-coupled by the different sides of the double-sided input coupler 930 in the blue waveguide combiner plate 915. Vectors 1245 and 1250 indicate approximate directions for propagation of the blue component of virtual image light guided from the different sides of the double-sided virtual image output coupler 960.

Figure 13:
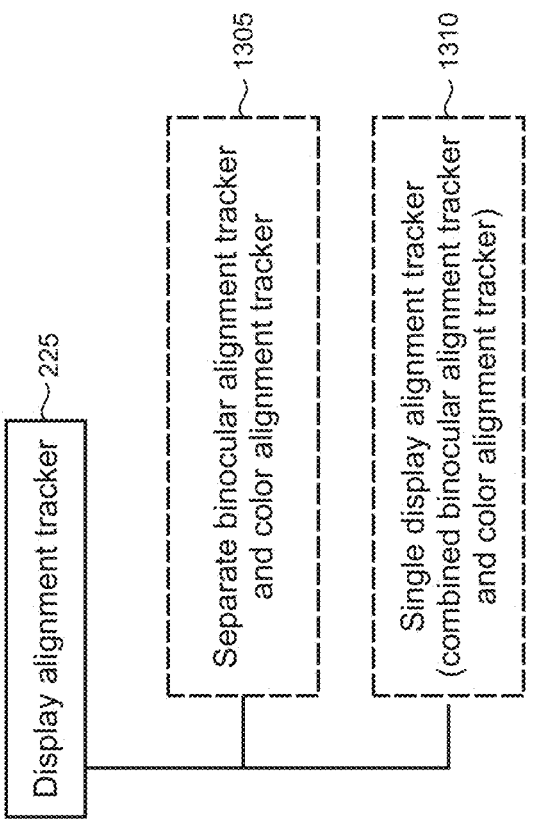
FIG. 13 shows illustrative embodiments of a display alignment tracker.

The display alignment tracker 225 is alternatively configurable in different embodiments, as shown in the taxonomy 1300 in FIG. 13. The embodiments include a separate color and binocular tracker embodiment 1305 configured to track and control alignment of pixels in displays supported by each of the waveguide combiners in the binocular-pair 505 (FIG. 5) to ensure satisfactory color fidelity and binocular alignment of the displays in both of the waveguide combiners in the binocular-pair 505 (FIG. 5). A single display alignment tracker embodiment 1310 combines the features and functionalities of both the color alignment tracker and binocular embodiments in one system.

Figure 14:
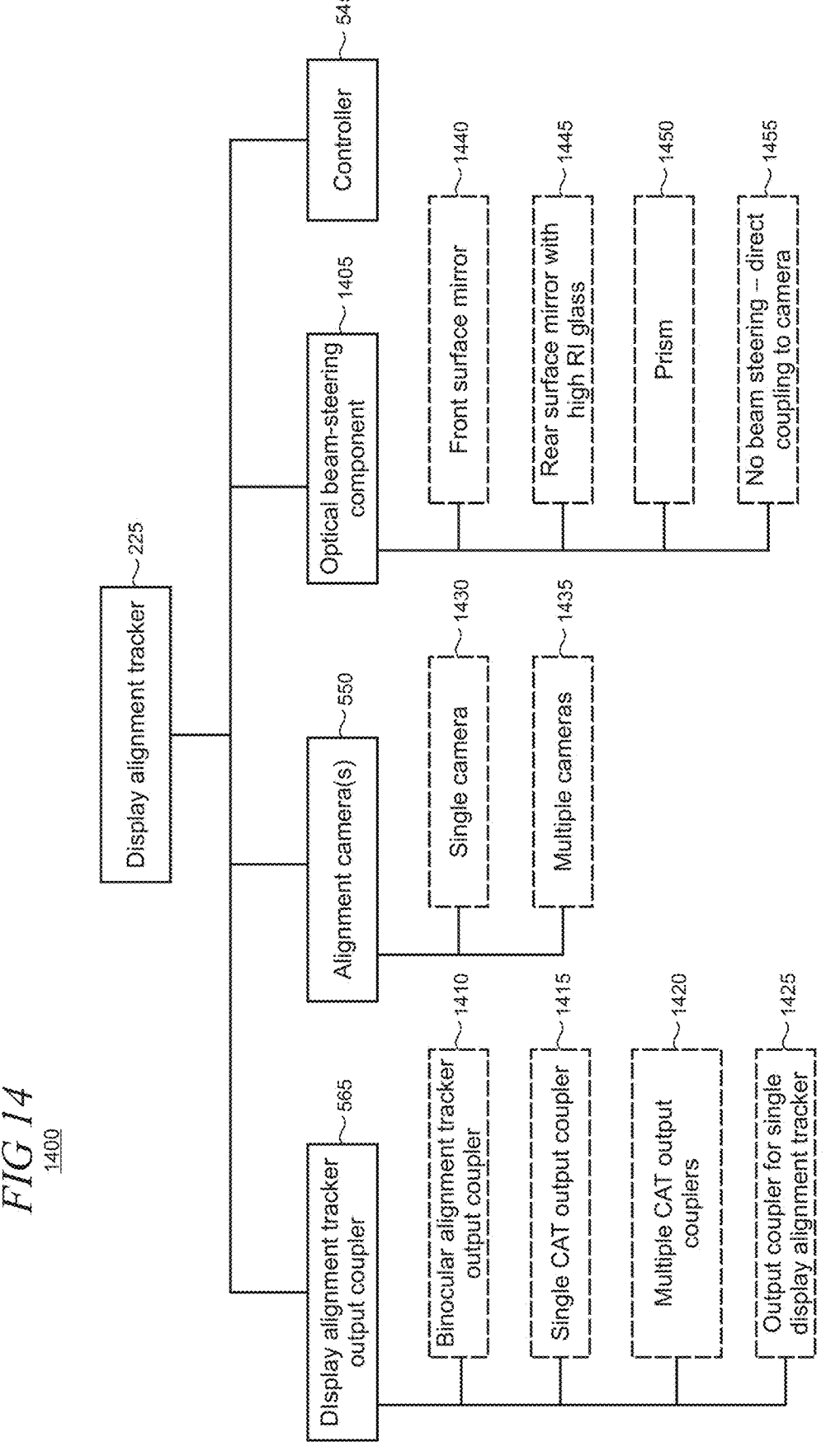
FIG. 14 shows illustrative embodiments of components of a display alignment tracker.

FIG. 14 is a taxonomy 1400 showing illustrative embodiments of components of the display alignment tracker 225. The components may be alternatively embodied depending on the configuration of the display alignment tracker as a single combined system or as separate binocular and color alignment trackers. The components include a display alignment tracker output coupler 565, one or more alignment cameras 550, an optical beam-steering component 1405, and controller 545. A brief overview of the component embodiments is first presented, followed by additional description within the context provided by the illustrative embodiment of the display alignment tracker 1310 (combined binocular and color alignment trackers in one system) and embodiment 1305 (separate binocular and color alignment trackers).

The controller 545 is configured to receive alignment signals from the display alignment tracker output coupler 565. The controller is typically implemented as a programmable component in which software programming can be varied, as appropriate, to support a particular display alignment tracker configuration.

The display alignment tracker output coupler 565 is generally embodied differently to optimize its grating structures and performance characteristics to a particular display alignment tracker configuration. Accordingly, illustrative embodiments for the display alignment tracker output coupler include a binocular alignment tracker output coupler

1410, a single-color alignment tracker output coupler 1415 implemented per waveguide combiner plate, multiple color alignment tracker output couplers 1420 implemented per waveguide combiner plate, and an output coupler 1425 for the single display alignment tracker that combines the color alignment tracker and binocular embodiments together.

The display alignment tracker camera 550 is alternatively embodied in a single camera 1430 or as multiple cameras 1435. The single camera embodiment is typically utilized with single and binocular alignment tracker embodiments to reduce size, weight, and complexity of the HMD device, although multiple cameras may be utilized in some applications. Multiple cameras are typically utilized with the color alignment tracker only embodiment in which, for example, one camera is associated with the waveguide combiner stack for each of the user's eyes.

The optical beam-steering component 1405 is typically utilized to implement a folded light path for the optical alignment signals between the display alignment tracker output coupler and camera to provide for a compact HMD device form factor. The optical beam-steering component is alternatively embodied as a front surface mirror 1440, rear surface mirror 1445 using high refractive index (RI) glass (e.g., n>1.7-1.8), or a prism 1450. In some cases, a beam-steering component is not utilized—in this case, for example, optical alignment signals are out-coupled directly to the camera—as indicated by reference numeral 1455.

Figure 15:
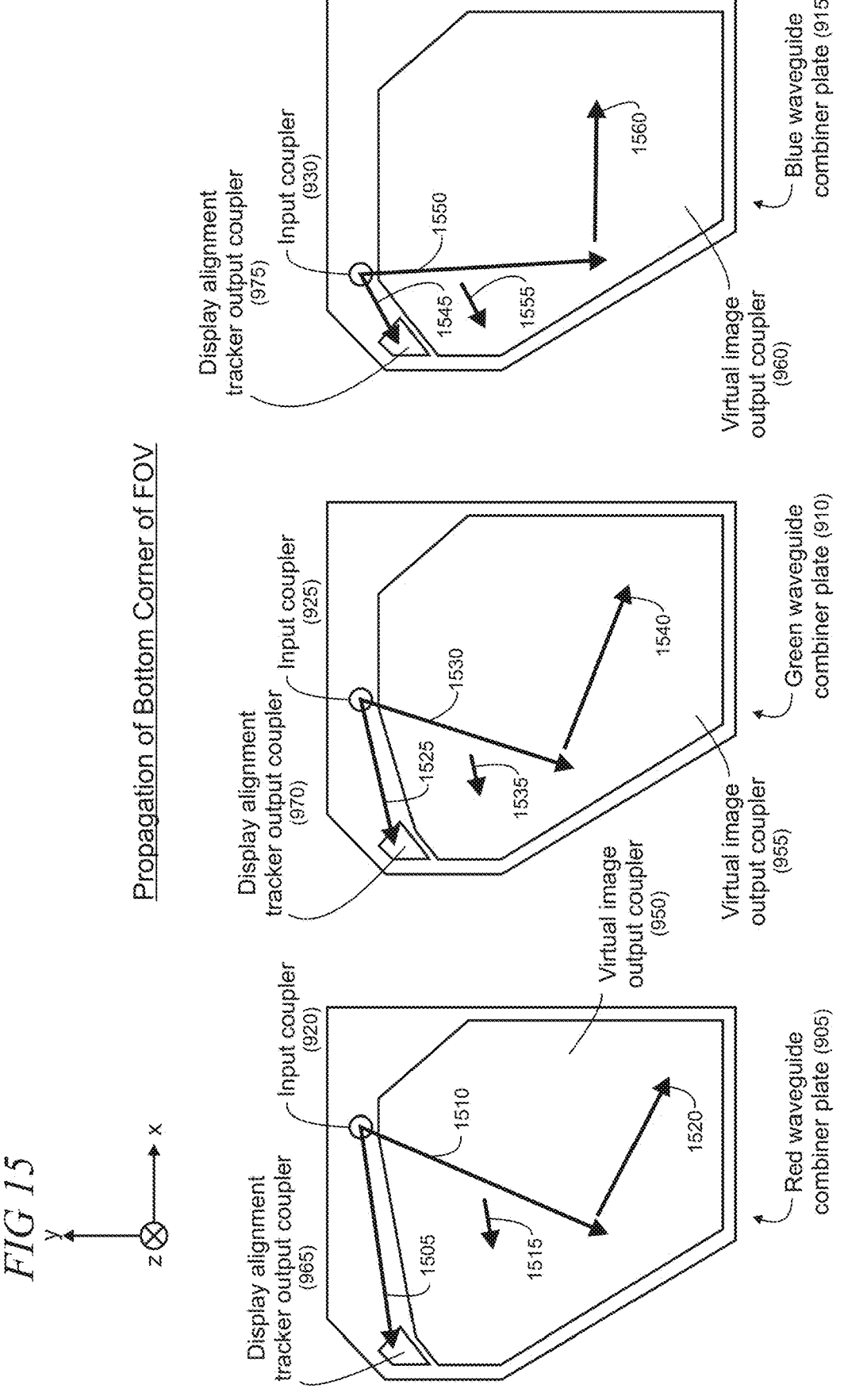
FIG. 15 shows propagation of virtual image light in respective plates of a waveguide combiner for bottom corner angles within an FOV of a near-eye display system.
Figure 16:
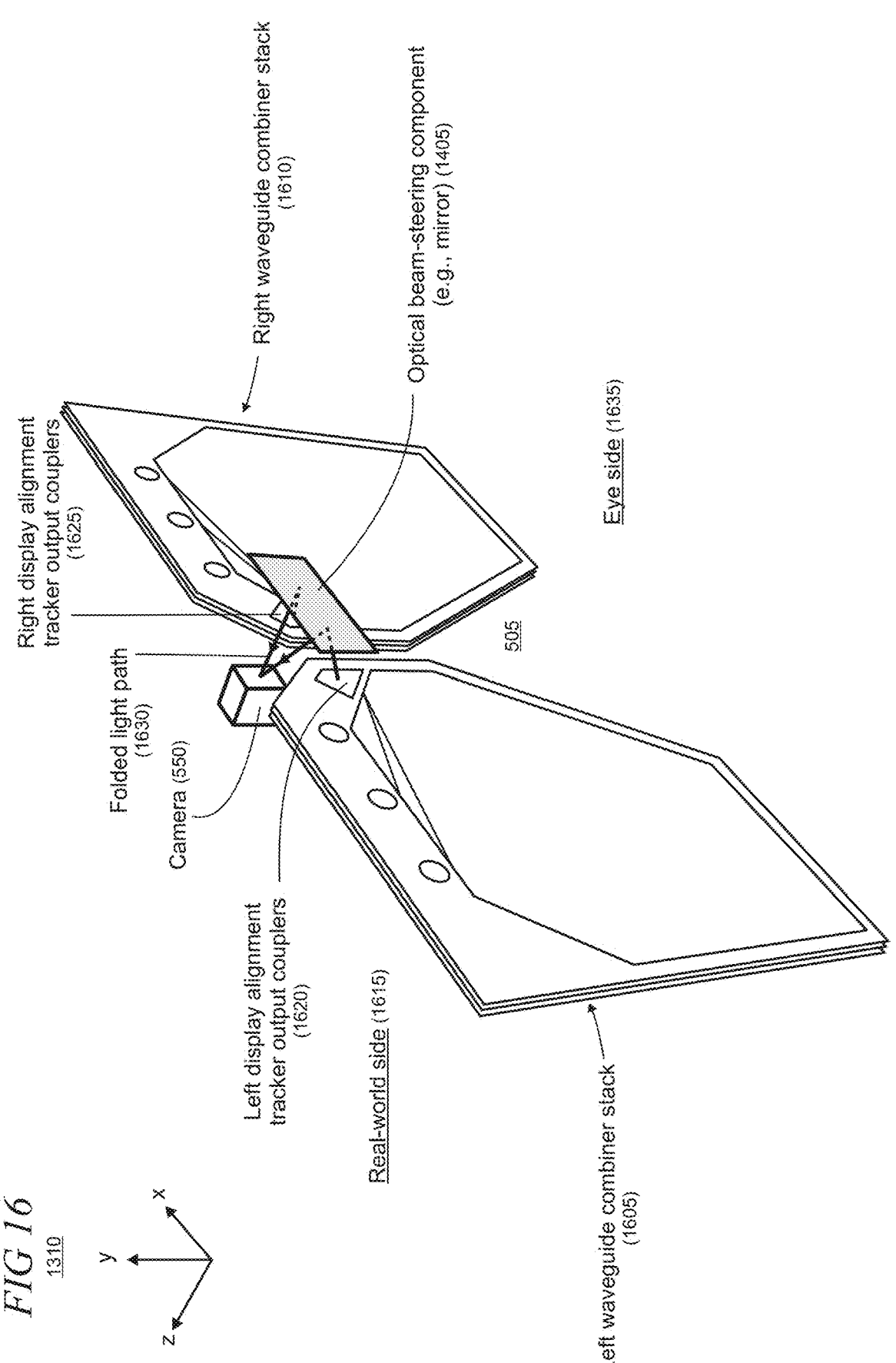
FIG. 16 is a pictorial view of components of an illustrative near-eye display system with a display alignment tracker.
Figure 17:
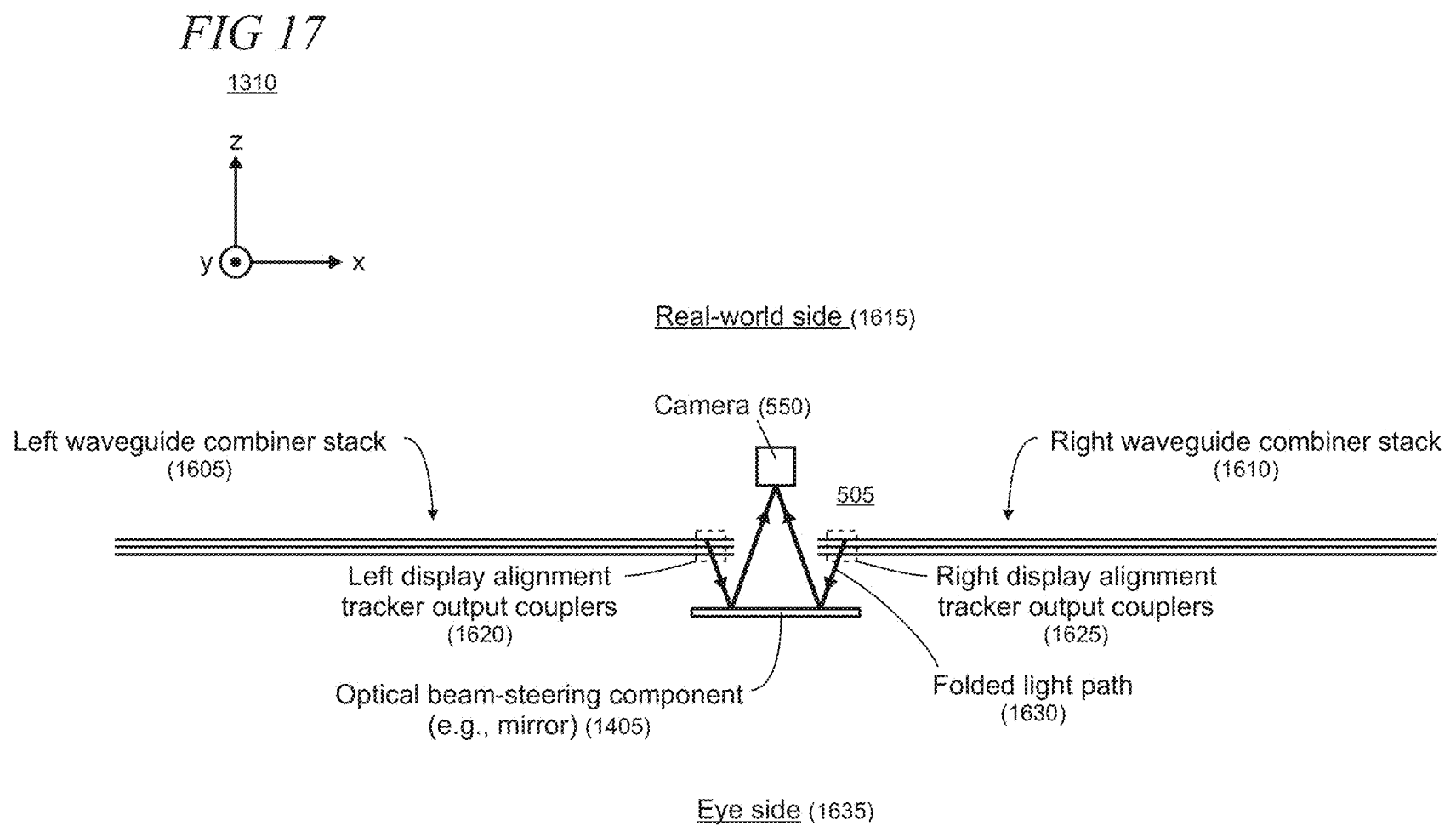

FIGS. 15, 16, and 17 show illustrative waveguide combiners and display alignment trackers for the single display alignment tracker embodiment 1310 (combined binocular and color alignment tracker in one system) shown in FIG. 13. FIG. 15 shows propagation of virtual image light in respective plates 905, 910, and 915 of a waveguide combiner for virtual image light coming from the bottom right corner of the right eye plates with a 20-degree horizontal and 20-degree vertical angle (i.e., towards the direction of the user's nose and forehead). Grating vectors and parameters for the input couplers 920, 925, and 930 are selected to enable virtual image light from respective projectors to be guided towards the display alignment tracker output couplers 965, 970, and 975. In particular, the input coupler gratings are configured such that light propagates at angles in the waveguides between the input coupler and display alignment tracker output couplers with a minimum number of TIR bounces.

As shown in the drawing, vectors 1505 and 1510 indicate approximate directions for propagation of the red component of virtual image light for the bottom right corner of the FOV as in-coupled by the different sides of the double-sided input coupler 920 in the red waveguide combiner plate 905. Vectors 1515 and 1520 indicate approximate directions for propagation of the red component of virtual image light guided from the different sides of the double-sided virtual image output coupler 950.

Vectors 1525 and 1530 indicate approximate directions for propagation of the green component of virtual image light for the bottom right corner of the FOV as in-coupled by the different sides of the double-sided input coupler 925 in the green waveguide combiner plate 910. Vectors 1535 and 1540 indicate approximate directions for propagation of the green component of virtual image light guided from the different sides of the double-sided virtual image output coupler 955.

Vectors 1545 and 1550 indicate approximate directions for propagation of the blue component of virtual image light for the bottom right corner of the FOV as in-coupled by the different sides of the double-sided input coupler 930 in the blue waveguide combiner plate 915. Vectors 1555 and 1560 indicate approximate directions for propagation of the blue component of virtual image light guided from the different sides of the double-sided virtual image output coupler 960.

FIG. 16 is a pictorial view of components of the single display alignment tracker embodiment 1310. FIG. 17 is a top view of the components. The near-eye display system components shown include left 1605 and right 1610 stacks that form the binocular-pair of waveguide combiners 505. The display alignment tracker camera 550 is centrally located between the waveguide combiners on the real-world side 1615 around the user's nasal area. The camera captures optical alignment signals out-coupled by the left 1620 and right 1625 display alignment tracker output couplers. The signals follow a folded light path 1630 implemented using the optical beam-steering component 1405 such as a mirror (e.g., mirror 1440 or mirror 1445 shown in FIG. 14 and described in the accompanying text). The optical beam-steering component is centrally located on the eye side 1635 of the waveguide combiners around the user's nasal area.

To minimize overall depth of the display alignment tracker hardware (e.g., camera and mirror), a relatively steep out-coupling angle is utilized for the optical alignment signals from the display alignment tracker output couplers. In an alternative embodiment, the prism 1450 (FIG. 14) is utilized to guide the optical alignment signals to the camera 550. In another alternative embodiment, a direct light path between the output couplers and camera is utilized without the use of a mirror or other optical beam-steering device.

Figure 18:
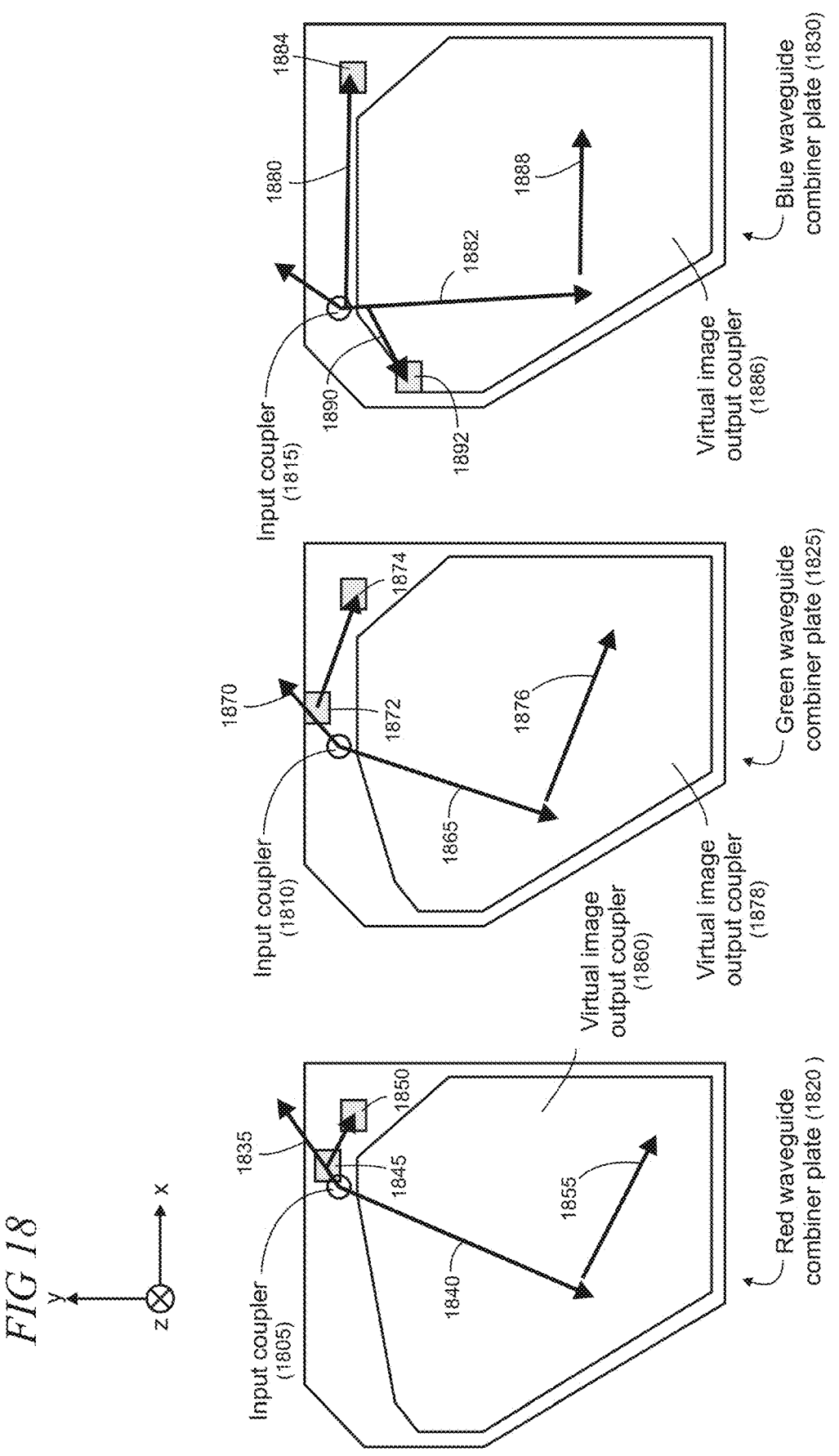
FIG. 18 shows propagation of virtual image light in respective plates of a waveguide combiner for bottom corner angles within an FOV of a near-eye display system that includes a color alignment tracker and a binocular alignment tracker (BAT)
Figure 19:
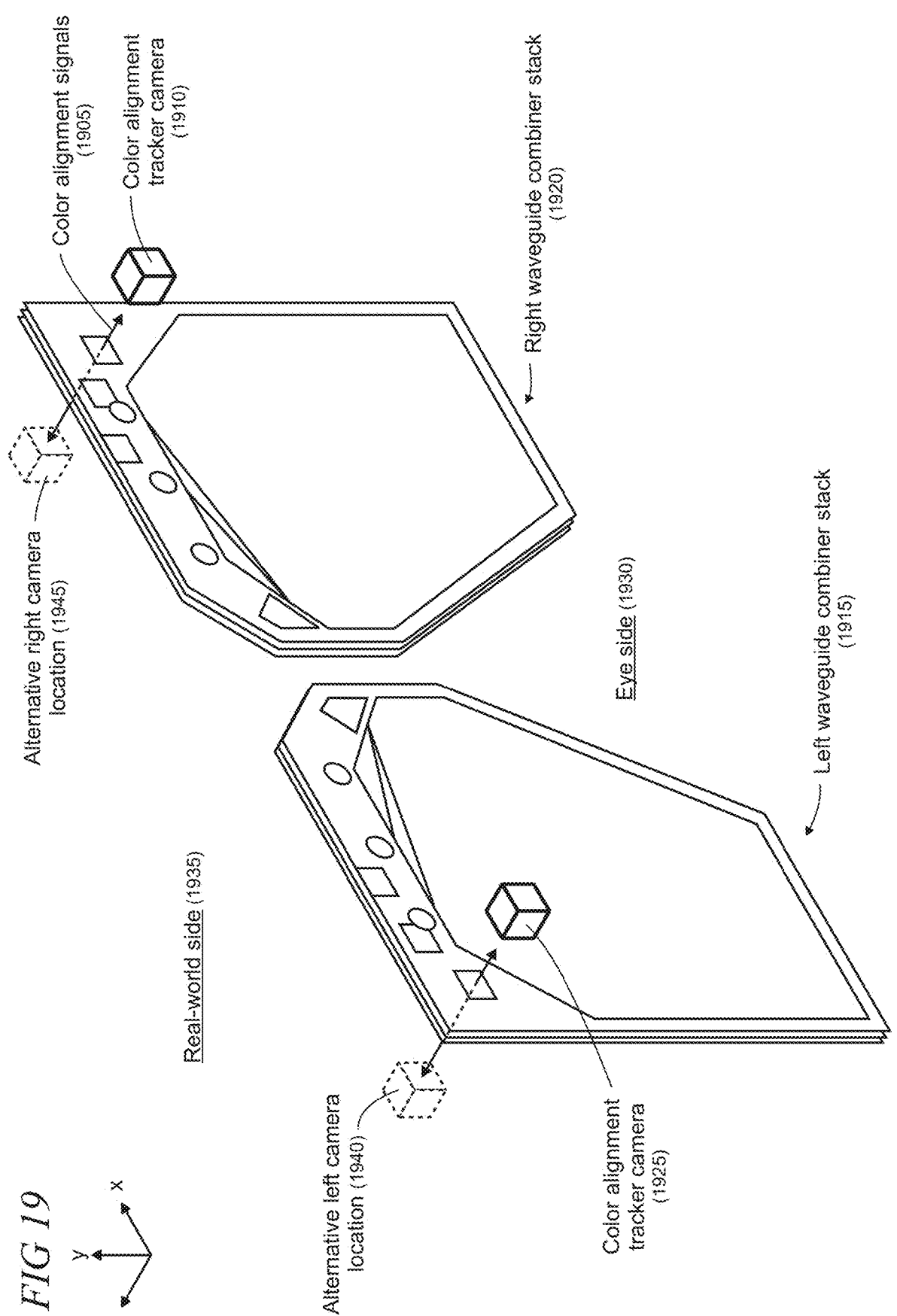
FIG. 19 is a pictorial view of components of an illustrative color alignment tracker.

FIGS. 18, 19, and 20 show illustrative waveguide combiners and color alignment tracker for the separate color alignment tracker embodiment 1305 shown in FIG. 13. In this illustrative example, the area extending from the input couplers 1805, 1810, and 1815 on respective RGB waveguide combiner plates 1820, 1825, and 1830 to the waveguide edge around the user's nasal area is kept clear of optical elements. This may be done for a variety of purposes such as maximizing light transmittance to the bottom waveguide plates in the stack or for some other purpose. Simultaneous color and binocular alignment tracking can be performed using the input coupler in combination with additional diffraction gratings that are disposed on each of the waveguide combiner plates.

As shown in FIG. 18, vectors 1835 and 1840 indicate approximate propagation directions for virtual image light that is in-coupled by the input coupler 1805. Vector 1835 shows light guided to the top right of the red waveguide combiner plate 1820 towards diffraction gratings 1845 and 1850. In this illustrative example, two additional diffraction gratings are utilized per each waveguide combiner plate. In alternative embodiments, one additional diffraction grating per plate may be utilized. Diffraction grating 1850 is configured to out-couple optical alignment signals, in the form of color alignment signals 1905 in this illustrative embodiment, to color alignment tracker camera 1910 as shown in FIGS. 19 and 20 (FIG. 19 provides a pictorial view and FIG. 20 provides a top view of the waveguide combiners and color alignment tracker).

A separate color alignment tracker camera is utilized for each of the left 1915 and right 1920 waveguide combiner stacks in a binocular-pair. The color alignment tracker cameras 1910 and 1925 are located on the eye side 1930 of the waveguide combiners. In an alternative embodiment, the color alignment tracker cameras are located on the real-world side 1935, as indicated by reference numerals 1940 and 1945.

Returning to FIG. 18, the vector 1855 indicates the approximate direction of propagation of the red component of virtual image light by the virtual image output coupler 1860 disposed on the red waveguide combiner plate 1820. Vectors 1865 and 1870 indicate approximate propagation directions for the green component of virtual image light that is in-coupled by the different sides of the double-sided input coupler 1810. Vector 1870 shows light guided in the green waveguide combiner plate 1825 towards diffraction gratings 1872 and 1874. For example, the opposite diffraction order (i.e., the diffracted order on the opposite side of the zero-order (or direct) optical beam having the same absolute value but opposite sign) is utilized in order to push the light towards the top right part of the plate. Diffraction grating 1874 is configured to out-couple optical alignment signals, in the form of color alignment signals in this illustrative embodiment, to the color alignment tracker camera 1910 (FIG. 19). Vector 1876 indicates the approximate direction of propagation of the green component of virtual image light imparted by the virtual image output coupler 1878 disposed on the green waveguide combiner plate 1825.

Vectors 1880 and 1882 indicate approximate propagation directions for the blue component of virtual image light that is in-coupled by the input coupler 1815. Vector 1880 shows light guided to the top right of the blue waveguide combiner plate 1830 towards diffraction grating 1884 that is configured to out-couple optical alignment signals, in the form of color alignment signals in this illustrative embodiment, to the color alignment tracker camera 1910 (FIG. 19). The virtual image output coupler 1886 is configured to propagate virtual image light for exit pupil replication and out-coupling to the HMD device user's eye, as representatively indicated by vector 1888. The virtual image output coupler 1886 is further configured to push light towards the nasal edge of the waveguide, as indicated by vector 1890, and diffraction grating 1892. Diffraction grating 1892 is configured to output optical alignment signals to a binocular alignment tracker camera in a similar manner as described above in the text accompanying FIGS. 15-17 above. It may be appreciated that all three waveguide combiner plates are utilized to provide color alignment tracking signals while only the blue waveguide combiner plate is utilized to provide binocular tracking signals in this example.

Color distortion (i.e., chromatic aberration) occurring in the virtual image display can vary according to FOV and eye position of the HMD device user. It may be appreciated that the SRGs used in the waveguide combiner typically have some wavelength-dependent characteristics which can result in color distortion of the displayed virtual images. In an illustrative example, the HMD device is configured with an eye tracking system, as described below in reference to FIGS. 24 and 25. The eye tracking system is utilized to determine the user's eye position. By utilizing pre-defined color distortion maps that provide corrections for different locations within the FOV, the rendering of the virtual images can be adjusted to provide a corrected image to compensate for color distortion and/or other aberrations in the near-eye display system. Separate color distortion maps may be provided for each RGB component to implement color alignment during real-time rendering of virtual images that is more optimized and performant compared to simple x and y offsets.

FIG. 21 is a flowchart 2100 of an illustrative method for configuring an input coupler disposed on a waveguide combiner in a near-eye display system employable by a user. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps are optionally utilized.

Block 2105 includes providing a waveguide combiner comprising a transparent waveguide plate through which the user looks to view a real-world environment, in which an input coupler and a virtual image output coupler are disposed on the waveguide combiner, the input coupler in-coupling light for virtual images from a display engine into the waveguide combiner and the virtual image output coupler out-coupling the virtual image light to the user's eye.

Block 2110 includes providing the waveguide combiner with a display alignment tracker output coupler for out-coupling virtual image light propagating in the waveguide combiner towards a display alignment tracker camera. Block 2115 includes configuring grating features on the input coupler for simultaneously guiding in-coupled virtual image light to the virtual image output coupler and the display alignment tracker output coupler.

Figures 22, 23:
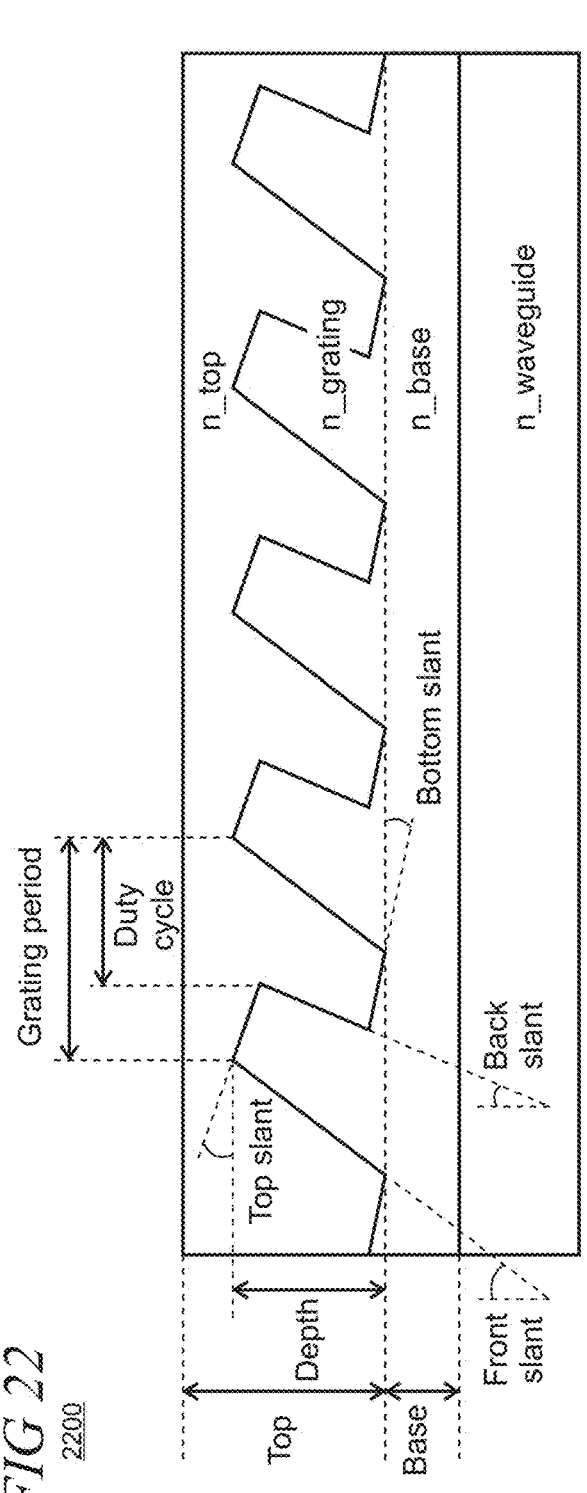
FIG. 22 shows design parameters that may be varied to implement desired characteristics in a surface relief grating (SRG)
FIG. 23 shows various illustrative modulation schemes for an SRG.

FIG. 22 shows various illustrative design parameters that may be varied to implement desired characteristics in a surface relief grating (SRG) 2200 used for input and output couplers and additional diffraction gratings shown in the drawings and described above. The SRG is typically fabricated using lithographic techniques including, for example, nano-imprint lithography (NIL) which enables the topological structure of gratings to be optimized to achieve desired functionality in terms of both spectral and angular performance dimensions. The angular bandwidth of an SRG (i.e., the FOV that can be processed) can typically be tuned by optimizing the various parameters of the grating features. These include, for example, front and back slant angles, grating fill factor, coatings such as metallized coatings, grating depth, and grating period. Additional material variables include the refractive indices of the grating structure, grating base, grating top layer, grating coating, and underlying waveguide. It may be appreciated that the above-described design parameters can generally be applied to various types of gratings including, for example, binary, multilevel, blazed, and slanted.

FIG. 23 shows various illustrative modulation schemes for the SRG 2200. These include depth modulation 2305, duty cycle modulation 2310, and slant modulation 2315 which can be used as additional optimizations of grating structures. Such optimizations may be utilized, for example, to increase angular bandwidth over a large and uniform eyebox.

Figure 24:
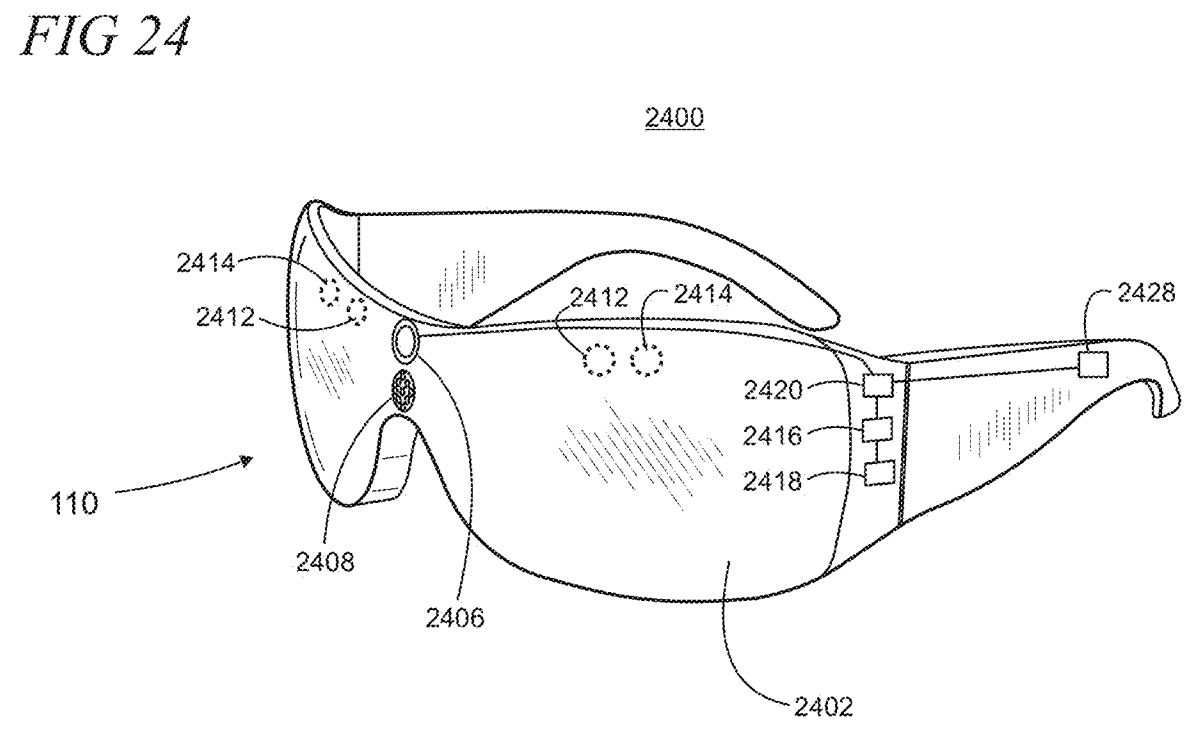
Figure 25:
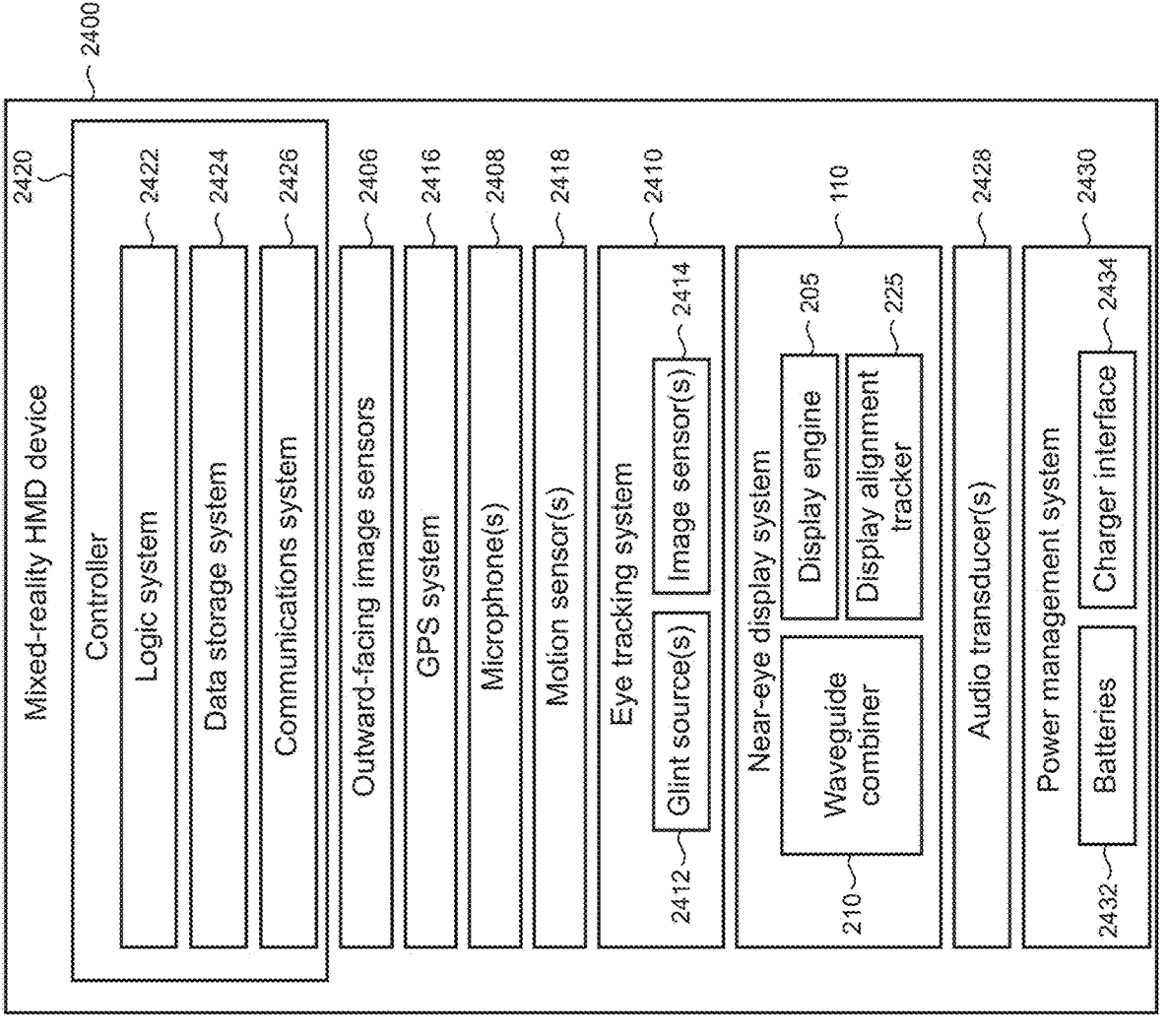
FIG. 25 shows a block diagram of an illustrative example of a mixed-reality HMD device that is configurable to use the present near-eye display with display alignment tracker.

The present binocular near-eye display with display alignment tracker may be utilized in HMD devices having a variety of form factors and features. FIG. 24 shows one particular illustrative example of a mixed-reality HMD device 2400, and FIG. 25 shows a functional block diagram of the device 2400. The HMD device comprises one or more lenses 2402 that form a part of a see-through display system 110, so that images are displayed using lenses 2402 (e.g., using projection onto lenses 2402, one or more waveguide systems, such as a near-eye display system, incorporated into the lenses 2402, and/or in any other suitable manner).

The HMD device 2400 further comprises one or more outward-facing image sensors 2406 configured to acquire images of a background scene and/or physical environment being viewed by a user and includes one or more microphones 2408 configured to detect sounds, such as voice commands from a user. Outward-facing image sensors 2406 include one or more depth sensors and/or one or more two-dimensional image sensors. In alternative arrangements, as noted above, a mixed-reality or virtual-reality display system, instead of incorporating a see-through display system, displays mixed-reality or virtual-reality images through a viewfinder mode for an outward-facing image sensor.

The HMD device 2400 further includes an eye tracking system 2410 configured for detecting a direction of gaze of each eye of a user or a direction or location of focus, as described above. The eye tracking system is configured to determine gaze directions of each of a user's eyes in any suitable manner. For example, in the illustrative example shown, the eye tracking system includes one or more glint sources 2412, such as infrared light sources, that are configured to cause a glint of light to reflect from each eyeball of a user, and one or more image sensors 2414, such as inward-facing sensors, that are configured to capture an image of each eyeball of the user. Changes in the glints from the user's eyeballs and/or a location of a user's pupil, as determined from image data gathered using the image sensor(s) 2414, are used to determine a direction of gaze.

In addition, a location at which gaze lines projected from the user's eyes intersect the external display is used to determine an object at which the user is gazing (e.g., a displayed virtual object and/or real background object). The eye tracking system 2410 has any suitable number and arrangement of light sources and image sensors. In some implementations, the eye tracking system may be omitted.

The HMD device includes a near-eye display system 110 comprising a display engine 205, waveguide combiner 210, and display alignment tracker as previously described above.

The HMD device 2400 also includes additional sensors in some embodiments. For example, HMD device 2400 includes a global positioning system (GPS) system 2416 to allow a location of the HMD device 2400 to be determined. This may help to identify real-world objects, such as buildings, etc., that are located in the user's adjoining physical environment.

The HMD device 2400 further includes one or more motion sensors 2418 (e.g., inertial, multi-axis gyroscopic, or acceleration sensors) to detect movement and position/orientation/pose of a user's head when the user is wearing the system as part of a mixed reality or virtual reality HMD device. Motion data is usable, potentially along with eye-tracking glint data and outward-facing image data, for gaze detection, as well as for image stabilization to help correct for blur in images from the outward-facing image sensor(s) 2406. The use of motion data allows changes in gaze direction to be tracked even if image data from outward-facing image sensor(s) 2406 cannot be resolved.

In addition, motion sensors 2418, as well as microphone(s) 2408 and eye tracking system 2410, are employable as user input devices, such that a user interacts with the HMD device 2400 via gestures of the eye, neck and/or head, as well as via verbal commands in some cases. It may be understood that sensors illustrated in FIGS. 24 and 25 and described in the accompanying text are included for the purpose of example and are not intended to be limiting in any manner, as any other suitable sensors and/or combination of sensors are utilizable to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) are utilizable in some implementations.

The HMD device 2400 further includes a controller 2420 such as one or more processors having a logic system 2422 and a data storage system 2424 in communication with the sensors, eye tracking system 2410 and/or other components through a communications system 2426. The communications system 2426 facilitates the display system being operated in conjunction with remotely located resources, such as processing, storage, power, data, and services. That is, in some implementations, an HMD device is operable as part of a system that distributes resources and capabilities among different components and systems.

The storage system 2424 includes instructions stored thereon that are executable by logic system 2422, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2400 is configured with one or more audio transducers 2428 (e.g., speakers, earphones, etc.) so that audio can be utilized as part of a mixed-reality or virtual-reality experience. A power management system 2430 includes one or more batteries 2432 and/or protection circuit modules (PCMs) and an associated charger interface 2434 and/or remote power interface for supplying power to components in the HMD device 2400.

It may be appreciated that the HMD device 2400 is described for the purpose of example, and thus is not meant to be limiting. It may be further understood that the display system includes, in some embodiments, additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Various exemplary embodiments of the present binocular near-eye display with display alignment tracker are now presented by way of illustration and not as an exhaustive list of all embodiments. An example includes a near-eye display system employable by a user in a mixed-reality environment in which virtual images are simultaneously displayed over the user's views of a real world, comprising: a waveguide combiner comprising a stack of see-through waveguide combiner plates through which the user views the real world, each waveguide combiner plate in the stack configured to guide a respective component of light for the virtual images from an RGB (red, green, blue) color space; a plurality of input couplers, an individual input coupler disposed on each of the waveguide combiner plates, each input coupler configured to in-couple virtual images generated by a display engine into a respective waveguide combiner plate, in which the display engine comprises individual projectors for each of the RGB light components; a plurality of virtual image output couplers, an individual virtual image output coupler disposed on each of the waveguide combiner plates, each virtual image output coupler configured to out-couple virtual images from a respective waveguide combiner plate to the user's eye; a display alignment tracker comprising a camera and a controller configured to generate control signals for controlling the display engine responsively to optical alignment signals; and a plurality of display alignment tracker output couplers, an individual display alignment tracker output coupler disposed on each of the waveguide combiner plates, each display alignment tracker output coupler configured to receive virtual image light propagating in a respective waveguide combiner plate from the input coupler on the waveguide combiner plate and further configured to out-couple virtual image light to the camera as the optical alignment signals.

In another example, the individual display engine projectors each comprise an emissive panel including micro-LEDs (light emitting diodes) or micro-OLEDs (organic light emitting diodes) and projection optics including a collimating lens. In another example, each of the output couplers is configured for exit pupil expansion in two directions. In another example, the near-eye display system is configured as a binocular near-eye display system using a separate instance of the waveguide combiner for each of the user's eyes and in which the display alignment tracker determines binocular alignment of the separate waveguide combiner instances, and the controller generates control signals based on the determined binocular alignment. In another example, the display alignment tracker determines color alignment in the stack of see-through waveguide combiner plates and the controller generates control signals based on the determined color alignment.

A further example includes a head-mounted display (HMD) device wearable by a user and supporting a mixed-reality user experience comprising a display of virtual images for objects in a virtual world and real-world images for objects in a real world, comprising: a display engine for generating light for the virtual images; a binocular-pair of see-through waveguide combiners, each waveguide combiner having an eye-facing side and a real-world-facing side, and in which each waveguide combiner includes a see-through portion through which the user views the real world; a binocular alignment tracker output coupler disposed on each waveguide combiner in the binocular-pair of waveguide combiners; a binocular alignment tracker camera configured to capture binocular alignment signals from the binocular alignment tracker output couplers, the captured binocular alignment signals being used by a binocular alignment tracker controller for determining binocular alignment of the display; a virtual image output coupler, disposed on each waveguide combiner, configured for out-coupling the virtual images from the waveguide combiner to an eye of the user; and an input coupler, disposed on each waveguide combiner, configured for in-coupling the virtual image light from the display engine into a waveguide combiner and for guiding light towards the virtual image output coupler on the waveguide combiner for out-coupling as virtual images to the user and guiding light towards the binocular alignment tracker output coupler for out-coupling as binocular alignment signals.

In another example, the display engine generates polychromatic virtual images based on an RGB (red, green, blue) color model and the waveguide combiner comprises a single plate that propagates all colors of the RGB color model. In another example, the binocular alignment tracker controller provides control signals to the display engine to adjust the generating of virtual images to facilitate binocular display alignment. In another example, each see-through waveguide combiner in the binocular-pair of see-through waveguide combiners is implemented using a first see-through waveguide combiner plate, and the HMD device further comprises a second see-through waveguide combiner plate and a third see-through waveguide combiner plate for each see-thorough waveguide combiner in the binocular-pair, each of the see-through waveguide combiner plates having respective input couplers, binocular alignment tracker output couplers, and virtual image output couplers, and in which the first, second, and third see-through waveguide combiner plates are arranged in a stack in which each see-through waveguide combiner plate in the stack propagates light for the virtual images for a different component of an RGB (red, green, blue) color model. In another example, the HMD device further comprises one or more color alignment tracker output couplers disposed on each of the waveguide combiner plates in the stack in the binocular-pair of waveguide combiners. In another example, the HMD device further comprises a pair of color alignment cameras in which a color alignment camera is provided for each waveguide combiner stack in the binocular-pair of waveguide combiners, each color alignment camera configured to capture color alignment signals from the one or more color alignment tracker output couplers, the captured color alignment signals used by a color alignment tracker controller for determining color alignment of virtual images in the display. In another example, grating features on each of the input couplers in the stack of see-through waveguide combiner plates in the binocular-pair of see-through waveguide combiners is arranged with three grating periods and orientations for simultaneously guiding light to the virtual image output coupler, color alignment tracker output coupler, and binocular alignment tracker output coupler on a respective waveguide combiner plate in the stack. In another example, the binocular alignment tracker camera comprises a single camera located in the HMD device on the real-world-facing side of the waveguide combiner, and the HMD device further includes a beam steering optical component located in the HMD device on the eye-facing side of the waveguide combiner, in which the binocular alignment signals are out-coupled by the binocular alignment tracker output coupler, and steered by the beam steering optical component to the binocular alignment tracker camera and the beam steering optical component comprises one of front surface mirror, rear surface mirror using high refractive index glass, or prism. In another example, the HMD device further comprises an eye tracking system, wherein eye position-based color distortion maps are utilized for determining color alignment of virtual images in the display based on an eye position of the HMD device user.

A further example includes a method for configuring an input coupler disposed on a waveguide combiner in a near-eye display system employable by a user, the method comprising: providing a waveguide combiner comprising a transparent waveguide plate through which the user looks to view a real-world environment, in which an input coupler and a virtual image output coupler are disposed on the waveguide combiner, the input coupler in-coupling light for virtual images from a display engine into the waveguide combiner and the virtual image output coupler out-coupling the virtual image light to the user's eye; providing the waveguide combiner with a display alignment tracker output coupler for out-coupling virtual image light propagating in the waveguide combiner towards a display alignment tracker camera; and configuring grating features on the input coupler for simultaneously guiding in-coupled virtual image light to the virtual image output coupler and the display alignment tracker output coupler.

In another example, the input coupler is double-sided, in which a first side of the input coupler guides in-coupled virtual image light to the virtual image output coupler and a second side of the input coupler, opposite the first side, guides in-coupled virtual image light to the display alignment tracker output coupler. In another example, one side of the input coupler has grating features that are shallow relative to grating features on an opposite side of the input coupler and grating features on the opposite side of the input coupler are metallized. In another example, both sides of the double-sided input coupler couple virtual image light from the display engine in different directions. In another example, the display engine generates polychromatic virtual images based on a color model and one, two, or three separate waveguide plates are utilized to propagate colors of the color model. In another example, the method further comprises locating the input coupler and display alignment tracker output coupler on the waveguide plate such that no grating features are disposed on a waveguide plate between the input coupler and the display alignment tracker output coupler.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A near-eye display system employable by a user in a mixed-reality environment in which virtual images are simultaneously displayed over the user's views of a real world, comprising:
   a waveguide combiner comprising a stack of see-through waveguide combiner plates through which the user views the real world, each waveguide combiner plate in the stack configured to guide a respective component of light for the virtual images from an RGB (red, green, blue) color space;
   a plurality of input couplers, an individual input coupler disposed on each of the waveguide combiner plates, each input coupler configured to in-couple virtual images generated by a display engine into a respective waveguide combiner plate, in which the display engine comprises individual projectors for each of the RGB light components;
   a plurality of virtual image output couplers, an individual virtual image output coupler disposed on each of the waveguide combiner plates, each virtual image output coupler configured to out-couple virtual images from a respective waveguide combiner plate to the user's eye;
   a display alignment tracker comprising a camera and a controller configured to generate control signals for controlling the display engine responsively to optical alignment signals; and
   a plurality of display alignment tracker output couplers, an individual display alignment tracker output coupler disposed on each of the waveguide combiner plates, each display alignment tracker output coupler configured to receive virtual image light propagating in a respective waveguide combiner plate from the input coupler on the waveguide combiner plate and further configured to out-couple virtual image light to the camera as the optical alignment signals.

2. The near-eye display system of claim 1 in which the individual display engine projectors each comprise an emissive panel including micro-LEDs (light emitting diodes) or micro-OLEDs (organic light emitting diodes) and projection optics including a collimating lens.

3. The near-eye display system of claim 1 in which each of the output couplers is configured for exit pupil expansion in two directions.

4. The near-eye display system of claim 1 as configured as a binocular near-eye display system using a separate instance of the waveguide combiner for each of the user's eyes and in which the display alignment tracker determines binocular alignment of the separate waveguide combiner instances, and the controller generates control signals based on the determined binocular alignment.

5. The near-eye display system of claim 1 in which the display alignment tracker determines color alignment in the stack of see-through waveguide combiner plates and the controller generates control signals based on the determined color alignment.

6. A head-mounted display (HMD) device wearable by a user and supporting a mixed-reality user experience comprising a display of virtual images for objects in a virtual world and real-world images for objects in a real world, comprising:

a display engine for generating light for the virtual images;

a binocular-pair of see-through waveguide combiners, each waveguide combiner having an eye-facing side and a real-world-facing side, and in which each waveguide combiner includes a see-through portion through which the user views the real world;

a binocular alignment tracker output coupler disposed on each waveguide combiner in the binocular-pair of waveguide combiners;

a binocular alignment tracker camera configured to capture binocular alignment signals from the binocular alignment tracker output couplers, the captured binocular alignment signals being used by a binocular alignment tracker controller for determining binocular alignment of the display;

a virtual image output coupler, disposed on each waveguide combiner, configured for out-coupling the virtual images from the waveguide combiner to an eye of the user; and an input coupler, disposed on each waveguide combiner, configured for in-coupling the virtual image light from the display engine into a waveguide combiner and for guiding light towards the virtual image output coupler on the waveguide combiner for out-coupling as virtual images to the user and guiding light towards the binocular alignment tracker output coupler for out-coupling as binocular alignment signals.

7. The HMD device of claim 6 in which the display engine generates polychromatic virtual images based on an RGB (red, green, blue) color model and the waveguide combiner comprises a single plate that propagates all colors of the RGB color model.

8. The HMD device of claim 6 in which the binocular alignment tracker controller provides control signals to the display engine to adjust the generating of virtual images to facilitate binocular display alignment.

9. The HMD device of claim 6 in which each see-through waveguide combiner in the binocular-pair of see-through waveguide combiners is implemented using a first see-through waveguide combiner plate, and in which the HMD device further comprises a second see-through waveguide combiner plate and a third see-through waveguide combiner plate for each see-thorough waveguide combiner in the binocular-pair, each of the see-through waveguide combiner plates having respective input couplers, binocular alignment tracker output couplers, and virtual image output couplers, and in which the first, second, and third see-through waveguide combiner plates are arranged in a stack in which each see-through waveguide combiner plate in the stack propagates light for the virtual images for a different component of an RGB (red, green, blue) color model.

10. The HMD device of claim 9 further comprising one or more color alignment tracker output couplers disposed on each of the waveguide combiner plates in the stack in the binocular-pair of waveguide combiners.

11. The HMD device of claim 10 further comprising a pair of color alignment cameras in which a color alignment camera is provided for each waveguide combiner stack in the binocular-pair of waveguide combiners, each color alignment camera configured to capture color alignment signals from the one or more color alignment tracker output couplers, the captured color alignment signals used by a color alignment tracker controller for determining color alignment of virtual images in the display.

12. The HMD device of claim 11 in which grating features on each of the input couplers in the stack of see-through waveguide combiner plates in the binocular-pair of see-through waveguide combiners is arranged with three grating periods and orientations for simultaneously guiding light to the virtual image output coupler, color alignment tracker output coupler, and binocular alignment tracker output coupler on a respective waveguide combiner plate in the stack.

13. The HMD device of claim 10 in which the binocular alignment tracker camera comprises a single camera located in the HMD device on the real-world-facing side of the waveguide combiner, and in which the HMD device further includes a beam steering optical component located in the HMD device on the eye-facing side of the waveguide combiner, in which the binocular alignment signals are out-coupled by the binocular alignment tracker output coupler, and steered by the beam steering optical component to the binocular alignment tracker camera and wherein the beam steering optical component comprises one of front surface mirror, rear surface mirror using high refractive index glass, or prism.

14. The HMD device of claim 11 further comprising an eye tracking system, wherein eye position-based color distortion maps are utilized for determining color alignment of virtual images in the display based on an eye position of the HMD device user.

15. A method for configuring an input coupler disposed on a waveguide combiner in a near-eye display system employable by a user, the method comprising:

providing a waveguide combiner comprising a transparent waveguide plate through which the user looks to view a real-world environment, in which an input coupler and a virtual image output coupler are disposed on the waveguide combiner, the input coupler in-coupling light for virtual images from a display engine into the waveguide combiner and the virtual image output coupler out-coupling the virtual image light to the user's eye;

providing the waveguide combiner with a display alignment tracker output coupler for out-coupling virtual image light propagating in the waveguide combiner towards a display alignment tracker camera; and configuring grating features on the input coupler for simultaneously guiding in-coupled virtual image light to the virtual image output coupler and the display alignment tracker output coupler.

16. The method of claim 15 in which the input coupler is double-sided and in which a first side of the input coupler guides in-coupled virtual image light to the virtual image output coupler and a second side of the input coupler, opposite the first side, guides in-coupled virtual image light to the display alignment tracker output coupler.

17. The method of claim 16 in which one side of the input coupler has grating features that are shallow relative to grating features on an opposite side of the input coupler, and in which grating features on the opposite side of the input coupler are metallized.

18. The method of claim 16 in which both sides of the double-sided input coupler couple virtual image light from the display engine in different directions.

19. The method of claim 15 in which the display engine generates polychromatic virtual images based on a color model and one, two, or three separate waveguide plates are utilized to propagate colors of the color model.

20. The method of claim 15 further comprising locating the input coupler and display alignment tracker output coupler on the waveguide plate such that no grating features are disposed on a waveguide plate between the input coupler and the display alignment tracker output coupler.

* * * * *